United States Patent
Okubo et al.

(10) Patent No.: US 11,835,191 B2
(45) Date of Patent: Dec. 5, 2023

(54) VEHICLE LIGHT FIXTURE

(71) Applicant: Ichikoh Industries, Ltd., Isehara (JP)

(72) Inventors: Yasuhiro Okubo, Isehara (JP); Yasufumi Suzuki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 43 days.

(21) Appl. No.: 17/598,714

(22) PCT Filed: Mar. 27, 2020

(86) PCT No.: PCT/JP2020/014262
§ 371 (c)(1),
(2) Date: Sep. 27, 2021

(87) PCT Pub. No.: WO2020/196880
PCT Pub. Date: Oct. 1, 2020

(65) Prior Publication Data
US 2022/0178509 A1    Jun. 9, 2022

(30) Foreign Application Priority Data

Mar. 28, 2019  (JP) ................. 2019-064077
Jun. 11, 2019  (JP) ................. 2019-108404
Aug. 1, 2019   (JP) ................. 2019-142106

(51) Int. Cl.
  *F21S 41/25*    (2018.01)
  *F21S 41/143*   (2018.01)
  (Continued)

(52) U.S. Cl.
  CPC ............ *F21S 41/143* (2018.01); *B60Q 1/381* (2022.05); *F21S 41/25* (2018.01); *F21S 45/47* (2018.01);
  (Continued)

(58) Field of Classification Search
  None
  See application file for complete search history.

(56) References Cited

U.S. PATENT DOCUMENTS

2015/0023043 A1    1/2015  Yang et al.
2018/0257546 A1    9/2018  Johnson et al.

FOREIGN PATENT DOCUMENTS

EP    2 543 542 A1    1/2013
EP    3 178 698 A1    6/2017
(Continued)

OTHER PUBLICATIONS

Supplementary European Search Report dated Nov. 25, 2022 in European Patent Application No. 20777762.4, 1 page.
(Continued)

*Primary Examiner* — Elmito Breval
(74) *Attorney, Agent, or Firm* — Oblon, McClelland, Maier & Neustadt, L.L.P.

(57) ABSTRACT

A vehicle light fixture include a first light distribution illuminator that emits a first light distribution to the front of a vehicle, and a second light distribution illuminator that emits a second light distribution having a light-dark boundary line at least on a side of the vehicle, wherein illumination of the first light distribution illuminator and the second light distribution illuminator is controlled in response to a predetermined operation of the first light distribution illuminator by the driver of the vehicle. The second light distribution illuminator includes a light source, and a projection lens that projects light emitted from the light source to form an illumination pattern surrounded by multiple light-dark boundary lines and emit the illumination pattern to a side of the vehicle, and the projection lens focuses more of the light emitted from the light source passing outwardly from the optical axis of the projection lens.

16 Claims, 20 Drawing Sheets

(51) Int. Cl.
 F21S 45/47 (2018.01)
 B60Q 1/38 (2006.01)
 *F21W 102/10* (2018.01)

(52) U.S. Cl.
 CPC ..... *B60Q 2400/50* (2013.01); *F21W 2102/10* (2018.01)

(56) References Cited

FOREIGN PATENT DOCUMENTS

| | | |
|---|---|---|
| EP | 3 342 643 A1 | 7/2018 |
| JP | 7-125573 A | 5/1995 |
| JP | 2013-54902 A | 3/2013 |
| WO | WO 2016/027315 A1 | 2/2016 |

OTHER PUBLICATIONS

International Search Report dated Jun. 16, 2020 in PCT/JP2020/014262 filed on Mar. 27, 2020 (2 pages).
The First Office Action dated Aug. 10, 2323 in corresponding Chinese Patent Application No. 202080024906.0 (with English translation)(10 pages).

VEHICLE LIGHT FIXTURE

TECHNICAL FIELD

The present invention relates to a vehicle light fixture.

BACKGROUND ART

In recent years, a technology is known in which vehicle light fixtures that illuminate a pattern on a road surface from a vehicle are used to allow pedestrians or drivers of other vehicles, etc., to recognize the pattern (refer to, for example, Patent Literature 1). Such vehicle light fixtures project an illumination pattern onto a road surface in the vicinity of the vehicle to form an illumination pattern in the vicinity of the vehicle (for example, Patent Literature 2). For example, there is known a vehicle light fixture that can partially illuminate a road surface in front of the outer side of a vehicle to form an illumination pattern, and can alert a driver of a motorcycle by presenting this illumination pattern to the driver (for example, Patent Literature 3).

CITATION LIST

Patent Literature

PTL 1: WO2016/027315
PTL 2: US2018/0257546
PTL 3: Japanese Unexamined Patent Publication No. 7-125573

SUMMARY OF THE INVENTION

Problems to be Solved by the Invention

The road surface illumination device described in Patent Literature 1 acquires vehicle information from an in-vehicle device mounted on a vehicle, estimate an operation to be performed by the vehicle on the basis of the acquired vehicle information, and illuminate the road surface with a pattern corresponding to the estimated operation. However, the configuration described in Patent Literature 1 requires a large-scale system, and the lamp is larger to emit various patterns, and thus the manufacturing costs are high.

Since the technology described in Patent Literature 2 only projects an illumination pattern onto the road surface around the vehicle, it is difficult to recognize the shape of the illumination pattern unless the light intensity of the light source is increased. Since the vehicle light fixtures described in Patent Literature 3 only partially illuminate the road surface to form an illumination pattern, the driver of a motorcycle may not be able to determine whether or not the illumination pattern is formed by the vehicle the motorcycle is about to pass or by the light radiating from nearby street lights or the like. For this reason, the vehicle light fixture described in Patent Literature 3 has room for improvement from the viewpoint of appropriately alerting persons in the vicinity of the vehicle.

An object of the disclosure, which has been made in view of the above, is to provide a vehicle light fixture capable of radiating a pattern on a road surface while suppressing size enlargement and cost increase. Another object of the disclosure is to provide a vehicle light fixture that facilitates recognition of the shape of an illumination pattern without causing an increase in the light intensity of a light source, and a vehicle light fixture that forms an illumination pattern that can appropriately alert persons in the vicinity.

Means for Solving the Problem

A vehicle light fixture according to the disclosure includes a first light distribution illuminator that emits a first light distribution to the front of a vehicle; and a second light distribution illuminator that emits a second light distribution to at least a side of the vehicle, wherein illumination of the first light distribution illuminator and the second light distribution illuminator is controlled in response to a predetermined operation of the first light distribution illuminator by the driver of the vehicle, the second light distribution illuminator is illuminated in conjunction with the illumination of the first light distribution illuminator, and the second light distribution has a light-dark boundary line.

A vehicle light fixture is controlled to illuminate in conjunction with illumination of a first vehicle light fixture that emits a first light distribution to the front of a vehicle, when the first vehicle light fixture is illuminated in response to a predetermined operation by the driver of the vehicle; the first vehicle light fixture includes a light source; and a projection lens that projects light emitted from the light source to form an illumination pattern surrounded by multiple light-dark boundary lines and emits the illumination pattern to a side of the vehicle, wherein the projection lens focuses more of the light emitted from the light source as the light passes farther outward of the optical axis of the projection lens, and focuses the light emitted from the light source on at least a portion of the light-dark boundary lines for emphasis.

The second light distribution illuminator may emit the second light distribution outside a visible area where the first light distribution is visible from outside the vehicle in the left-right direction while the second light distribution illuminator is mounted in the vehicle.

The second light distribution illuminator may include a forward illuminator that illuminates the front of the vehicle, and the forward illuminator illuminates inside of a visible area where the first light distribution is visible from outside the vehicle in the left-right direction while the forward illuminator is mounted in the vehicle.

The maximum luminous intensity of the second light distribution may be lower than the maximum luminous intensity of the first light distribution.

The second light distribution may have a light-dark boundary line.

The second light distribution may have a geometric shape.

At least the first light distribution may constitute a vehicle turn lamp.

Effect of the Invention

The vehicle light fixture according to the disclosure can provide a vehicle light fixture capable of radiating a pattern on a road surface while suppressing size enlargement and cost increase. The vehicle light fixture according to the disclosure can facilitates recognition of the shape of an illumination pattern without causing an increase in the light intensity of a light source, and forms an illumination pattern that can appropriately alert persons in the vicinity.

MODE FOR CARRYING OUT THE INVENTION

Embodiments of a vehicle light fixture will now be described with reference to the drawings. Note that the present invention is not limited by the embodiments. The components in the following embodiments include ones that can be easily replaced by persons skilled in the art, or ones that are substantially the same.

In the following description, each of the front-rear, up-down, and right-left directions is a direction in an in-vehicle state where a vehicle light fixture is mounted on a vehicle, and indicates a direction when the traveling direction of the vehicle is viewed from the driver's seat. In the present embodiment, it is assumed that the up-down direction is parallel to the vertical direction, and the front-back direction and right-left direction are the horizontal direction.

Figure 1:
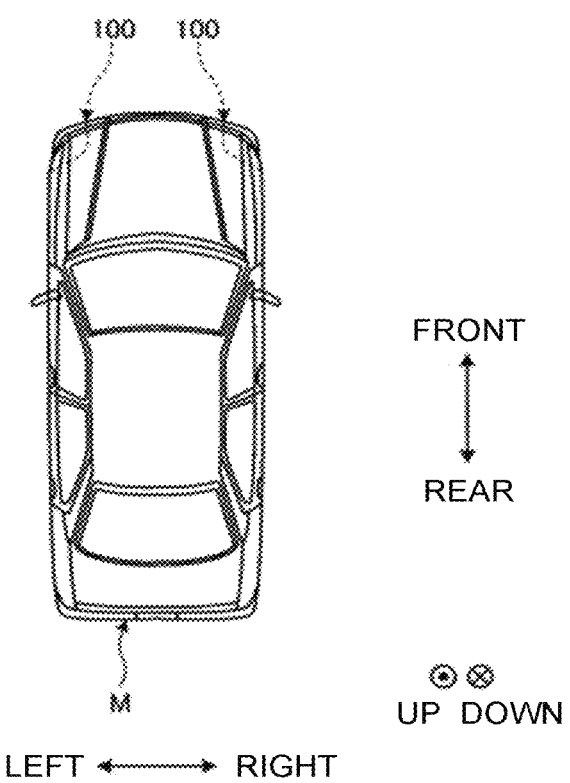
FIG. 1 is a diagram illustrating an example of a vehicle light fixture according to an embodiment in a state mounted on a vehicle.
Figure 2:
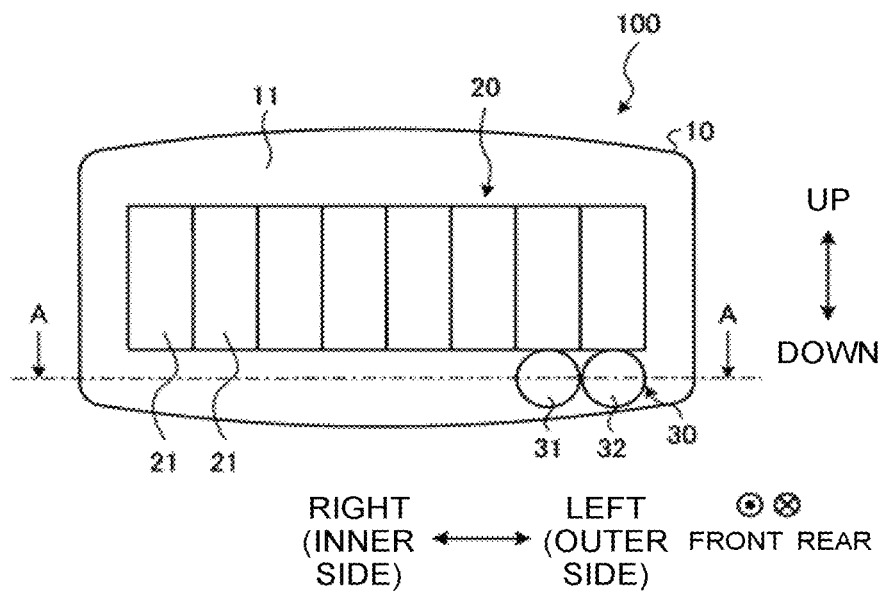
FIG. 2 is a schematic diagram illustrating an example of a vehicle light fixture according to an embodiment.
Figure 3:
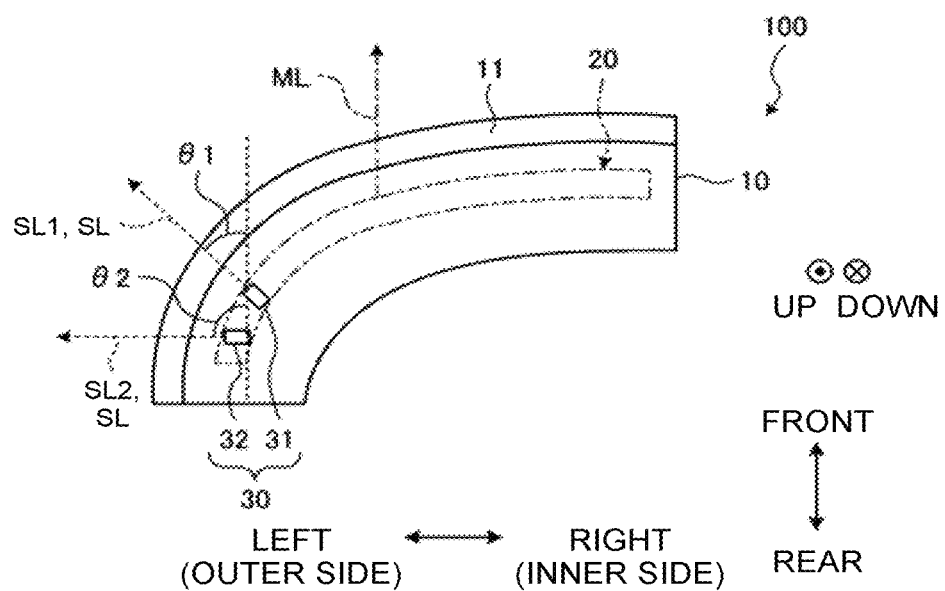
FIG. 3 is a schematic diagram illustrating an example of a vehicle light fixture according to an embodiment.

FIG. 1 is a diagram illustrating an example of vehicle light fixtures 100 according to an embodiment in a state mounted on a vehicle M. As illustrated in FIG. 1, the vehicle light fixtures 100 of the present embodiment each includes a vehicle turn lamp and is a vehicle front light that is mounted on the left and right front portions of the vehicle M. FIGS. 2 and 3 are schematic diagrams illustrating examples of the vehicle light fixture 100 according to the present embodiment. FIG. 2 is a view from the front of the vehicle, and FIG. 3 is a cross-sectional view taken along plane A-A in FIG. 2. As illustrated in FIGS. 2 and 3, the vehicle light fixture 100 includes a housing 10, a main light distribution illuminator 20, and a sub-light distribution illuminator 30. In FIGS. 2 and 3 and the following description, a vehicle light fixture 100 mounted on the left front side of the vehicle is used as an example. The same description can be given for the vehicle light fixture mounted on the right front side of the vehicle M by reading "left" as "right" or vise versa.

The housing 10 accommodates the main light distribution illuminator 20 and the sub-light distribution illuminator 30. The main light distribution illuminator 20 and the sub-light distribution illuminator 30 constitute a vehicle turn lamp. The housing 10 includes an outer lens 11 shared between the main light distribution illuminator 20 and the sub-light distribution illuminator 30. Light ML emitted from the main light distribution illuminator 20 and light SL emitted from the sub-light distribution illuminator 30 are both transmitted through the same outer lens 11 and emitted. Note that, although not illustrated, the housing 10 in the present embodiment accommodates, for example, a lamp unit for low beam, a position lamp, etc., in addition to the main light distribution illuminator 20 and the sub-light distribution illuminator 30 of the vehicle turn lamp.

The main light distribution illuminator 20 emits main light distributions toward the front of the vehicle M in response to a predetermined signal from the vehicle. The predetermined signals from the vehicle include signals in response to predetermined operations of the vehicle, such as operation of a direction indicator mounted on the vehicle, operation of a hazard switch, and operation of a predetermined steering wheel. The predetermined signals from the vehicle include signals generated by operations other than those of the vehicle, such as signals generated when another vehicle (such as a motorcycle) approaching from behind is detected. The main light distribution illuminator 20 includes multiple light emitters 21 aligned in the left-right direction. The light emitters 21 are each of a reflective surface type that reflects, with a reflector, light generated by a light source, such as a semiconductor type light source. The main light distribution illuminator 20 can control the timing of turning on and off for each light emitter 21.

The sub-light distribution illuminator 30 emits sub-light distributions to an area below the area illuminated by the main light distribution in conjunction with the main light distribution illuminator 20 by the predetermined operation described above. The sub-light distribution illuminator 30 includes a forward illuminator 31 and a side illuminator 32. The forward illuminator 31 emits the forward light distributions SP1 described below. The side illuminator 32 emits the side light distributions SP2 described below.

The forward illuminator 31 emits the light SL1 in a direction tilting outward from the vehicle by an angle θ1 with respect to the direction toward the front of the vehicle. The angle θ1 can be set to approximately 45 degrees, for example, but is not limited to this value. The side illuminator 32 emits the light SL2 in a direction tilting outward from the vehicle by an angle θ2 with respect to the direction toward the front of the vehicle. The angle θ2 can be set to approximately 90 degrees, for example. That is, the side illuminator 32 is disposed at a position that enables the light SL2 to be emitted outward from the vehicle (to the left in FIG. 3).

The sub-light distribution illuminator 30 is disposed at a position in close proximity to the light emitters 21 of the main light distribution illuminator 20. That is, in the vehicle light fixture 100, the light emitters 21 of the main light distribution illuminator 20, and the forward illuminator 31 and the side illuminator 32 of the sub-light distribution illuminator 30 both constitute the same light emitter mechanism for emitting a light fixture pattern.

Figure 4:
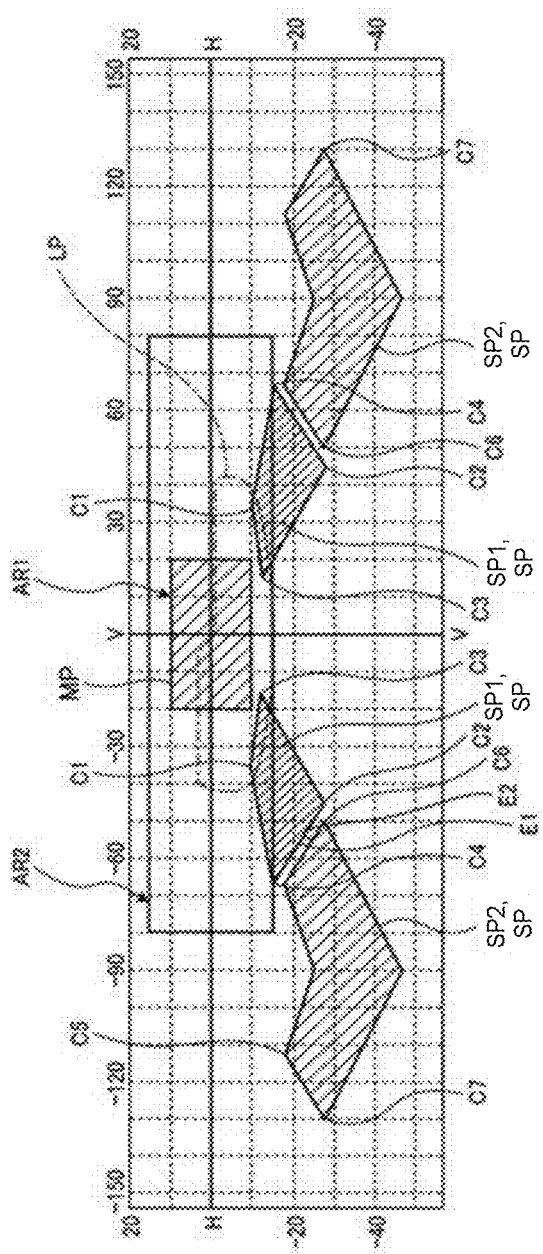
FIG. 4 is a diagram illustrating an example of an illumination pattern of a vehicle light fixture.

FIG. 4 is a diagram illustrating an example of an illumination pattern of the vehicle light fixture. FIG. 4 illustrates an example of a case in which a pattern illuminates a virtual screen around the vehicle. The H-H line in FIG. 4 represents a horizontal plane, and the V-V line represents a line perpendicular to the horizontal plane and indicating the center of the vehicle. The number on the horizontal axis in FIG. 4 is the angle in the left-right direction with respect to the V-V line. The right side of the V-V line is represented by a positive angle, and the left side of the V-V line is represented by a negative angle. The number on the longitudinal axis in FIG. 4 is the angle in the top-bottom direction with respect to the H-H line. The upper side of the H-H line is represented by a positive angle, and the lower side of the H-H line is represented by a negative angle.

In FIG. 4, the virtual screen has a central illuminated area AR1 and a visible area AR2. The central illuminated area AR1 is, for example, the area irradiated with main light distribution MP. The central illuminated area AR1 is set in a rectangular range of 20 degrees to the left and right along in the left-right direction with respect to a vertical line and 10 degrees in the up-down direction with respect to a horizontal plane, but the range is an example and is not limited thereto.

The visible area AR2 is an area in which the main light distribution MP is visible when the vehicle light fixture 100 is viewed from the outside of the vehicle. The visible area AR2 is the area including the central illuminated area AR1. The visible area AR2 is set in a range that expands outwardly, for example, by 60 degrees each to the left and right and by 5 degrees each to the top and bottom with respect to the central illuminated area AR1.

As illustrated in FIG. 4, the main light distribution MP is formed in the area including the intersection of the H-H line and the V-V line. The main light distribution MP is arranged, for example, to overlap with a low beam pattern LP emitted from a low-beam lamp unit disposed in the housing 10. The shape of the area illuminated by the main light distribution MP is not limited to the example illustrated in FIG. 4, and may be any other shape.

Sub-light distributions SP are emitted on the area below the area illuminated by the main light distribution MP. The sub-light distributions SP includes forward light distributions SP1 emitted onto the road surface in front of the vehicle M and side light distributions SP2 emitted onto the road surface on the side of the vehicle M. FIG. 4 illustrates a pattern for the vehicle light fixtures 100 on the left and right sides of the front portion of the vehicle M.

The forward light distributions SP1 are, for example, rectangular in shape, and the ends in the top-bottom direction and the ends in the left-right direction define corners. The forward light distributions SP1 are each emitted onto, for example, an area within a range of 10 to 30 degrees, inclusive, below the H-H line, and within a range of 15 to 70 degrees, inclusive, relative to the left and right of the V-V line.

The forward light distributions SP1 each illuminates an area overlapping the lower portion of the central illuminated area AR1 and the visible area AR2 in the vertical direction. That is, the uppermost corner C1 of each forward light distribution SP1 is incident within the central illuminated area AR1, and the lowermost corner C2 is incident outside the central illuminated area AR1 and the visible area AR2. The inner-vehicle corner C3 of each forward light distribution SP1 is incident within the central illuminated area AR1, and the outer-vehicle corner C4 is incident within the visible area AR2. Therefore, the forward light distributions SP1 illuminate the areas inside the central illuminated area AR1 and the visible area AR2 in the left-right direction.

The side light distributions SP2 are formed, for example, in a V-shape. The side light distributions SP2 are each emitted onto, for example, an area within a range of 20 to 50 degrees, inclusive, below the H-H line, and within a range of 30 to 150 degrees, inclusive, relative to the left and right of the V-V line.

The side light distributions SP2 are each incident below the central illuminated area AR1 and the visible area AR2. That is, the upper end C5 of each side light distribution SP2 is located below the lower edges of the central illuminated area AR1 and the visible area AR2. The edge E2 extending upwardly from the inner-vehicle end C6 of each side light distribution SP2 is disposed opposite to the edge E1 connecting the corner C2 and the corner C4 of the forward light distribution SP1. The edge E2 is parallel or substantially parallel to the edge E1 and is disposed at a predetermined distance to the edge E1.

In each side light distribution SP2, the inner-vehicle end C6 is positioned within the angular range of the central illuminated area AR1, and the outer-vehicle outer end C7 is positioned outside the angular range of the visible area AR2, in the left-right direction. That is, each side light distribution SP2 is positioned along an area from within the angular range of the central illuminated area AR1 to the outside of the angular range of the visible area AR2 across the angular range of the visible area AR2, in the left and right directions. In such a case, each side light distribution SP2 illuminates a range outside of the visible area AR2 in the left and right directions.

The sub-light distributions SP each including the forward light distribution SP1 and the side light distribution SP2, are set so that the maximum luminous intensity is lower than the maximum luminous intensity of the main light distribution. Therefore, the necessary luminous intensity can be achieved even when a small unit is used as the sub-light distribution illuminator 30. For this reason, it is possible to suppress the enlargement of the vehicle light fixture 100. The front light distributions SP1 and the side light distributions SP2 are set, for example, to be emitted at the same luminous intensity, but alternatively, may be set to be emitted at different luminous intensities.

Figure 5:
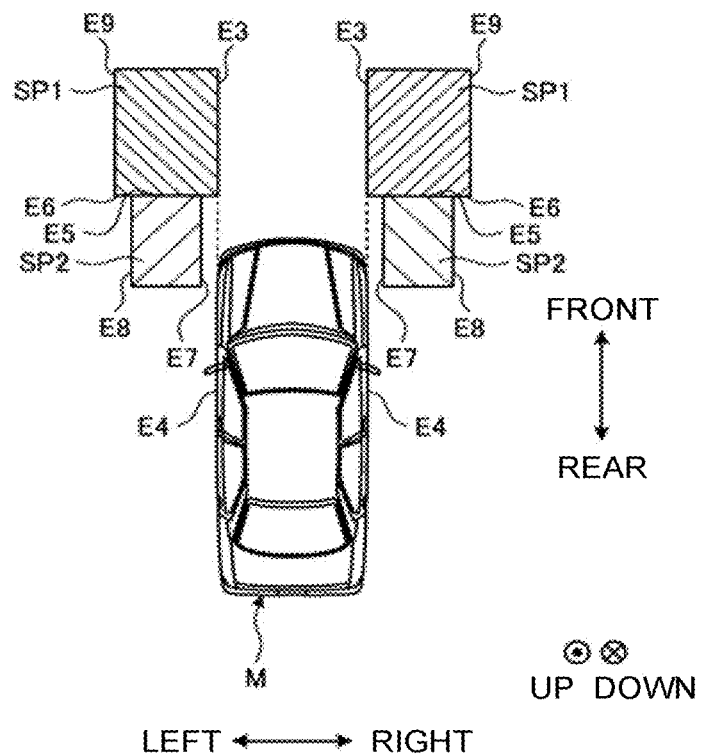
FIG. 5 is a diagram illustrating an example of a case in which forward light distributions and side light distributions are emitted onto a road surface.

FIG. 5 is a diagram illustrating an example of a case in which the forward light distributions SP1 and side light distributions SP2 are emitted onto a road surface. As illustrated in FIG. 5, the forward light distributions SP1 and the side light distributions SP2 are illuminate the road surface in a geometric shape, such as a rectangular shape. The front light distributions SP1 and the side light distributions SP2 have a light-dark boundary line. Therefore, the forward light distributions SP1 and the side light distributions SP2 illuminate the road surface so that the illuminated areas are clearly visible to pedestrians and like. The shape of the illuminated areas of the front light distributions SP1 and the side light distributions SP2 on the road surface are not limited to a rectangular shape, but may be any other shape. For example, the forward light distributions SP1 and the side light distributions SP2 may be circular, elliptical, elliptic, elliptic, etc., or polygonal shapes, such as triangular, pentagonal, or shapes including curves. The shape of the front light distributions SP1 and the shape of the side light distributions SP2 may be the same or may be different.

In FIG. 5, the forward light distributions SP1 are emitted such that the inner-vehicle edges E3 of align with the side edges E4 of the vehicle M, but this is not limited thereto. The forward light distributions SP1 may be disposed such that the edges E3 are disposed on the inner side of the vehicle M inside the side edges E4 of the vehicle M, or such that the edges E3 are disposed on the outer side of the vehicle M outside the side edges E4 of the vehicle M. The forward light distributions SP1 are disposed such that the rear edges E6 are positioned forward of the front end of the vehicle M. Therefore, it is possible to emit the forward light distributions SP1 at positions far from and forward of the vehicle.

The side light distributions SP2 are emitted, for example, to areas farther forward than the front end of the vehicle toward the lateral sides. The forward-vehicle edges E5 of the side light distributions SP2 overlap the rearward-vehicle edges E6 of the forward light distributions SP1. Therefore, the forward light distributions SP1 and the side light distributions SP2 are emitted in unison. Note that the positional relationship between each edge E5 and the corresponding edge E6 can be adjusted by adjusting the distances between the corresponding sides E1 and E2 illustrated in FIG. 4. For example, by adjusting the positional relationship between the sides E1 and E2 so that the edges E5 and E6 are disposed in each other's areas (so that the edge E5 is disposed in the forward light distribution SP1, and the edge E6 is disposed in the side light distribution SP2), a portion of the side light distribution SP2 is emitted overlappingly with the forward light distribution SP1. By adjusting the positional relationship between the sides E1 and E2 so that the edges E5 and E6 are separated from each other, the side light distribution SP2 is emitted at a distance from the forward light distribution SP1.

The inner-vehicle edge E7 of the side light distribution SP2 is disposed farther outward of the vehicle than the inner-vehicle edge E3 of the forward light distribution SP1. The outer-vehicle edge E8 of the side light distribution SP2 is disposed farther inward of the vehicle than the outer-vehicle edge E9 of the forward light distribution SP1. Therefore, the illuminated area of the side light distribution SP2 in the left-right direction is within the range of the illuminated area of the forward light distribution SP1.

Figure 6:
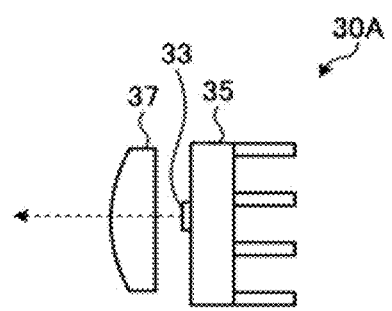
FIG. 6 is a diagram illustrating an example configuration of a sub-light distribution illuminator.
Figure 7:
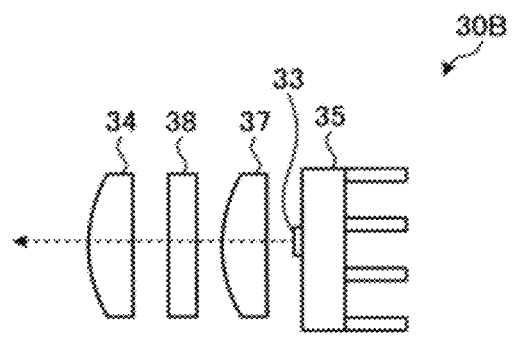
FIG. 7 is a diagram illustrating an example configuration of a sub-light distribution illuminator.

FIGS. 6 and 7 are diagrams illustrating configuration examples of the sub-light distribution illuminator 30. A sub-light distribution illuminator 30A illustrated in FIG. 6 includes a light source 33, a lens 34, and a heatsink 35. The light source 33 is a semiconductor type light source, such as an LED. The light source 33 emits, for example, an orange (amber) light. The lens 34 emits the light from the light source 33. The heatsink 35 supports the light source 33 and radiates the heat generated by the light source 33. In this configuration, the light from the light source 33 is emitted through the lens 34. The emitted light illuminates the road surface as a sub-light distribution SP having a shape controlled by the lens 34.

A sub-light distribution illuminator 30B illustrated in FIG. 7 includes, in addition to the configuration of the sub-light distribution illuminator 30A illustrated in FIG. 6, a lens 37 that emits the light from the light source 33 as collimated light or substantially collimated light, and a filter 38 that makes the light from the lens 37 into a geometrically-shaped sub-light distribution SP. In this configuration, the light from the light source 33 is made into collimated or substantially collimated light by the lens 37, passes through the filter 38, and is emitted from the lens 34. The emitted light illuminates the road surface as a sub-light distribution SP having, for example, a geometric shape. The filter 38 is replaceable. By replacing the filter 38, it is possible to emit a sub-light distribution SP having a different geometric shape.

The operation of the vehicle light fixture 100 having the above-described configuration will now be explained. When the driver performs a predetermined operation, such as the operation of a direction indicator or the operation of a hazard switch on the vehicle, the vehicle light fixture 100 controls the lighting of the main light distribution illuminators 20 and the sub-light distribution illuminators 30 in accordance with the operation.

The main light distribution illuminator 20 can, for example, gradually delay the timing of illumination of the light emitters 21 from the inside (right side) to the outside (left side) of the vehicle M at predetermined intervals so that the illuminated area is illuminated in such a manner that the illuminated area spreads from the inside of the vehicle M to the outside of the vehicle M (sequential illumination). The main light distribution illuminator 20 may turn on the light emitters 21 at the same timing. Alternatively, the main light distribution illuminator 20 may cause the light emitters 21 to blink at predetermined timings.

When the direction indicator or the hazard switch is operated, the sub-light distribution illuminator 30 lights up in conjunction with the main light distribution illuminator 20. In such a case, the sub-light distribution illuminator 30 emits light at the same timing as any of the light emitters 21 of the main light distribution illuminator 20. For example, when the main light distribution illuminator 20 performs the sequential lighting described above, the sub-light distribution illuminator 30 is lit at the same timing as that of the lighting of the light emitter 21 disposed on the outermost side of the vehicle M among the light emitters 21. Consequently, the main light distribution MP and the sub-light distribution SP can be emitted as a single light pattern. Note that the operation of the main light distribution illuminator 20 and the sub-light distribution illuminator 30 is not limited to the above, and they may be operated in conjunction with each other in other ways.

As described above, the vehicle light fixture 100 according to the present embodiment includes the main light distribution illuminator 20 that emits the main light distribution MP in front of the vehicle M in response to a predetermined signal from the vehicle, and the sub-light distribution illuminator 30 that emits the sub-light distribution SP below the illuminated area of the main light distribution MP in conjunction with the main light distribution illuminator 20.

In this configuration, the main light distribution illuminator 20 and the sub-light distribution illuminator 30 work in conjunction to emit the main light distribution MP and the sub-light distribution SP. The sub-light distribution SP can be readily formed on the road surface by the sub-light distribution SP that is emitted lower than the illuminated area of the main light distribution MP. Since there is no need to form a variety of patterns, the size of the sub-light distribution illuminator 30 is suppressed. Consequently, it possible to reduce the size and cost while a sub-light distribution SP can be emitted onto the road surface.

With the vehicle light fixture 100 according to the present embodiment, the sub-light distribution SP includes the forward light distribution SP1 that is emitted in front of the vehicle M; the sub-light distribution illuminator 30 includes the forward illuminator 31 that emits the forward light distribution SP1; and the forward illuminator 31 emits the forward light distribution SP1 inside the visible area AR2 in the left-right direction in the vehicle-mounted state. In this configuration, the sub-light distribution illuminator 30 can emits a forward light distribution SP1 limited to an area in front of the vehicle by the forward illuminator 31. By limiting the illuminated range in this manner, it is possible to diversify the sub-light distribution SP while reducing the size and cost of the forward illuminator 31.

With the vehicle light fixture 100 according to the present embodiment, the sub-light distribution SP includes the side light distribution SP2 that is emitted in front of the vehicle M; the sub-light distribution illuminator 30 includes the side illuminator 32 that emits the side light distribution SP2; and the side illuminator 32 emits the side light distribution SP2 inside the visible area AR2 in the left-right direction in the vehicle-mounted state. In this configuration, the side light distribution SP2 can be emitted to the outside of the visible area AR2, that is, the side of the vehicle. Consequently, size and cost of the sub-light distribution illuminator 30 can be suppressed while the sub-light distribution SP can be emitted over a wide area.

With the vehicle light fixture 100 according to the present embodiment, the predetermined signal includes a signal generated by a predetermined operation on the vehicle. In this configuration, in response to the operation of the direction indicator, the hazard switch, or the like of the vehicle M, the main light distribution illuminator 20 and the sub-light distribution illuminator 30 work in conjunction to emit the main light distribution MP and the sub-light distribution SP. Therefore, the sub-light distribution SP can be formed on the road surface without using a dedicated system or in-vehicle equipment.

With the vehicle light fixture 100 of the present embodiment, the maximum luminous intensity of the sub-light distribution SP is lower than that of the main light distribution MP. In this configuration, the necessary luminous intensity can be achieved even when a small unit is used as the sub-light distribution illuminator 30. Therefore, it is possible to suppress the enlargement of the vehicle light fixture 100.

With the vehicle light fixture 100 according to the present embodiment, the sub-light distribution SP may have a light-dark boundary line. This configuration allows pedestrians and like to clearly see the illuminated areas of the forward light distribution SP1 and the side light distribution SP2 on the road surface.

With the vehicle light fixture 100 according to the present embodiment, the sub-light distribution SP may have a geometric shape. This configuration allows pedestrians and like to clearly see the illuminated areas of the forward light distribution SP1 and the side light distribution SP2 on the road surface.

In the vehicle light fixture 100 according to the present embodiment, the main light distribution illuminator 20 and the sub-light distribution illuminator 30 constitute a vehicle turn lamp. This configuration enables the main light distribution MP and the sub-light distribution SP of the vehicle turn lamp to illuminate the road surface, while reducing the size and cost.

The technical scope of the present invention is not limited to the above embodiment, and can be modified as appropriate without departing from the spirit and scope of the present invention. For example, in the above embodiment, a configuration in which the sub-light distribution SP has a light-dark boundary line and a geometric shape is described as an example, but the embodiments are not limited thereto. The sub-light distribution SP may have a configuration without a light-dark boundary line. Alternatively, the sub-light distribution SP may have a shape different from the geometric shape, such as a shape of an arrow, or a may be a character.

In the above embodiment, the case in which the maximum luminous intensity of the sub-light distribution SP is lower than the maximum luminous intensity of the main light distribution MP is described as an example. As long as it is possible to use a small unit as the sub-light distribution illuminator 30, the maximum luminous intensity of the sub-light distribution SP may be the same as the maximum light intensity of the main light distribution MP, or may be higher than the maximum luminous intensity of the main light distribution MP.

In the above embodiment, a configuration in which the forward light distribution SP1 emitted inside the visible area AR2 in the left-right directions is described as an example, but the configuration is not limited thereto. The forward light distribution SP1 may have a configuration that allows the outside of the visible area AR2 to be illuminated in the left-right directions.

In the above embodiment, a configuration in which the side light distribution SP2 emitted inside the visible area AR2 in the left-right directions is described as an example, but the configuration is not limited thereto. The side light distribution SP2 may have a configuration that illuminates only inside the visible area AR2 in the left-right directions.

For example, in the above embodiment, a configuration in which the sub-light distribution SP includes a forward light distribution SP1 and a side light distribution SP2 is described as an example, but the configuration is not limited thereto. For example, one of the forward light distributions SP1 and the side light distribution SP2 may be omitted. In such a case, one of the forward illuminators 31 and the side illuminator 32 of the sub-light distribution illuminator 30 can be omitted.

For example, in the above-described embodiment, a case in which the main light distribution illuminator 20 and the sub-light distribution illuminator 30 constitute a vehicle turn lamp is described as an example, but the configuration is not limited thereto. For example, the main light distribution illuminator 20 may constitute a vehicle turn lamp, and the sub-light distribution illuminator 30 may be provided as a component independent of the vehicle turn lamp.

For example, in the above embodiment, the case in which the vehicle light fixture 100 including the main light distribution illuminator 20 and the sub-light distribution illuminator 30 is a vehicle front light is described as an example, but the case is not limited thereto. For example, a vehicle light fixture including a main light distribution illuminator 20 and a sub-light distribution illuminator 30 may be provided as a light fixture incorporated into a portion of a vehicle door mirror. Similarly, a vehicle light fixture including a main light distribution illuminator 20 and a sub-light distribution illuminator 30 may be incorporated into a digital mirror or the like that acquires information of the rear of the vehicle with a camera, besides into a door mirror.

A suitable specific example of the vehicle light fixture as the sub-light distribution illuminator 30A illustrated in FIG. 6 will now be described with reference to the drawings as a modification of the disclosure. That is, this modification presents a vehicle light fixture as a sub-light distribution illuminator 30 that emits a sub-light distribution SP in conjunction with a main light distribution illuminator 20 that emits a main light distribution MP in front of a vehicle M in response to a predetermined signal from the vehicle, wherein the sub-light distribution includes a side light distribution SP2 that is emitted to a side of the vehicle M and has a light-dark boundary line. Note that the vehicle light fixture according to this modification may be used in either a case in which the vehicle light fixture constitutes a vehicle turn lamp together with the main light distribution illuminator 20 as in the above embodiment, or a case in which the main light distribution illuminator 20 constitutes a vehicle turn lamp and the vehicle light fixture of this modification is provided as a component independent of the vehicle turn lamp.

[First Modification]

Figure 8:
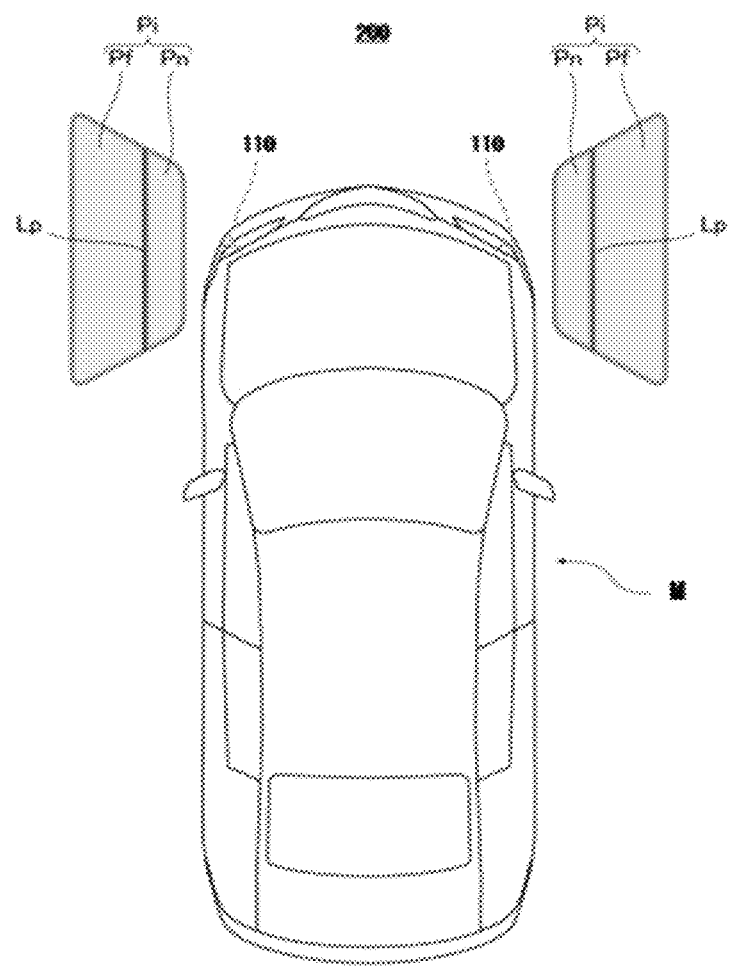
FIG. 8 is a diagram illustrating a vehicle light fixture according to a first modification of the disclosure being mounted on a vehicle and forming an illumination pattern.

Vehicle light fixtures 110 of the first modification will now be described with reference to FIGS. 8 to 14. As illustrated in FIG. 8, the vehicle light fixtures 110 of the first modification are used as light fixtures of a vehicle M, such as an automobile, and form illumination patterns Pi on a road surface 200 in the vicinity of the vehicle M, separately from front light fixtures provided on the vehicle M. Note that in FIG. 8, the size of the vehicle light fixtures 110 relative to the vehicle M is exaggerated in order to facilitate understanding of how the vehicle light fixtures 110 of this modification are installed, and does not necessarily correspond to the actual appearance. The vicinity of the vehicle M always includes a proximity area closer to the vehicle M than the front light areas illuminated by the front lights provided on the vehicle M, and may partially include the front light areas.

Figure 9:
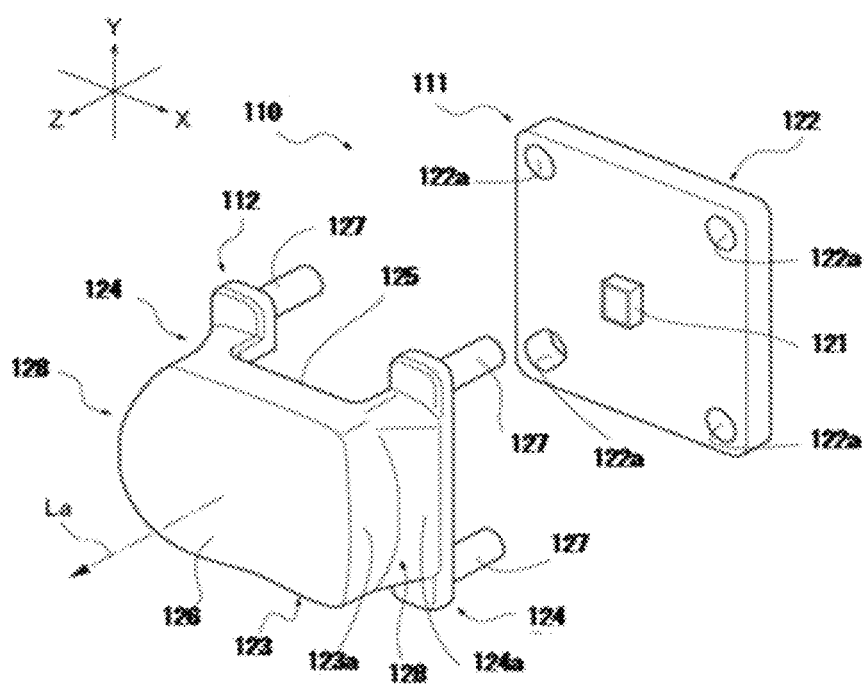
FIG. 9 is a diagram illustrating the configuration of the vehicle light fixture of the first modification.

In the first modification, the vehicle light fixtures 110 are disposed in the light compartments on both the left and right sides of the front of the vehicle. The light compartments are each formed by an open front end of a lamp housing being covered by an outer lens. The vehicle light fixture 110 is provided with the optical axis La tilting relative to the road surface 200. This is due to the light compartment being positioned higher than the road surface 200. In the following description, in the vehicle light fixture 110 as illustrated in FIG. 9, the direction in which the optical axis La extends or the direction in which light is emitted is defined as the optical axis direction (Z in the drawing), the vertical direction when the optical axis direction is along a horizontal plane is defined as the top-bottom direction (Y in the drawing), and the direction orthogonal to the optical axis direction and the top-bottom direction (horizontal direction) is defined as the width direction (X in the drawing).

The vehicle light fixture 110 is an assembly of a light source unit 111 and a projection lens 112, and constitutes a direct projection type road-surface projection unit. The vehicle light fixture 110 is installed in the vehicle M with the light source unit 111 and the projection lens 112 assembled and housed in a suitable housing.

In the light source unit 111, a light source 121 is mounted on a substrate 122. The light source 121 includes a light emitting element, such as a light emitting diode (LED), and is disposed such that the output optical axis coinciding with the optical axis La. In the first modification, the light source 121 emits amber monochromatic light (having a single peak in a graph in which the vertical axis is the light intensity and the horizontal axis is the wavelength) in a Lambertian distribution centered on the optical axis La. The light source 121 includes a rectangular-shaped light-emitting portion (a region that emits monochromatic light) viewed from the optical axis direction. Note that the light source 121 is not limited to the configuration of the first modification, and the color (wavelength band), the mode of distribution, the number of colors (the number of peaks in the graph described above), and the like in the emitted light can be set as appropriate.

The substrate 122 supplies power from the lighting control circuit as appropriate to light the light source 121. The substrate 122 is formed in a plane shape and is rectangular in shape when viewed from the optical axis direction. Mounting holes 122a are provided in the four corners of the substrate 122.

The substrate 122 of the first modification is composed of aluminum, and also functions as a heatsink member that releases heat generated by the mounted light source 121 to the outside. Note that an appropriate number of heat dissipation fins may be provided on the substrate 122. Alternatively, the light source unit 111 may have a configuration in which a separate heat dissipation member is placed on the substrate 122. The light emitted from the light source 121 of the light source unit 111 is projected onto the road surface 200 by the projection lens 112.

The projection lens 112 includes a lens body 123 that is a convex lens having a rectangular shape when viewed in the optical axis direction, and mounting portions 124 disposed on both sides. The rectangular shape may have curved sides as long as the rectangles has four corners (including those chamfered into a sphere or the like). A lens body 23 forms an illumination pattern Pi on a projection target (the road surface 200 of the first modification) by projecting light from the light source 121 while shaping it, and the incident surface 125 and the output surface 126 are free curved surfaces. The optical settings in the lens body 123 (the projection lens 112) will be described later. The projection lens 112 has a lens axis extending in the optical axis direction. The lens axis is an axis that is the optical center in the lens body 123.

The mounting portions 124 are provided as a pair at both sides of the lens body 123 in the width direction, and each of the mounting portions 124 protrudes to the rear side (the light source unit 111 side) in the optical axis direction. Each of the mounting portions 124 has a mounting protrusion 127 at an end in the top-bottom direction. Each mounting protrusion 127 is cylindrical in shape projecting rearwardly in the optical axis direction and is capable of being fitted into mounting holes 122a of the substrate 122. The mounting protrusions 127 of the mounting portion 124 is fitted to the corresponding mounting holes 122a, to cause the lens axis of the lens body 123 to be aligned with the optical axis La of the light source 121 of the light source unit 111.

The projection lens 112 has diffusing portions 128 on the end faces in the left-right direction. The end faces in the left-right direction have two side faces 123a of the lens body 123 and outer side faces 124a of the respective mounting portions 124. Each of the diffusing portions 128 diffuses light that is guided into the projection lens 112 and emitted from the two side faces 123a and the outer side faces 124a, and is formed, for example, by applying a grain processing or a blasting processing to the respective side faces (123a, 124a).

Figure 10:
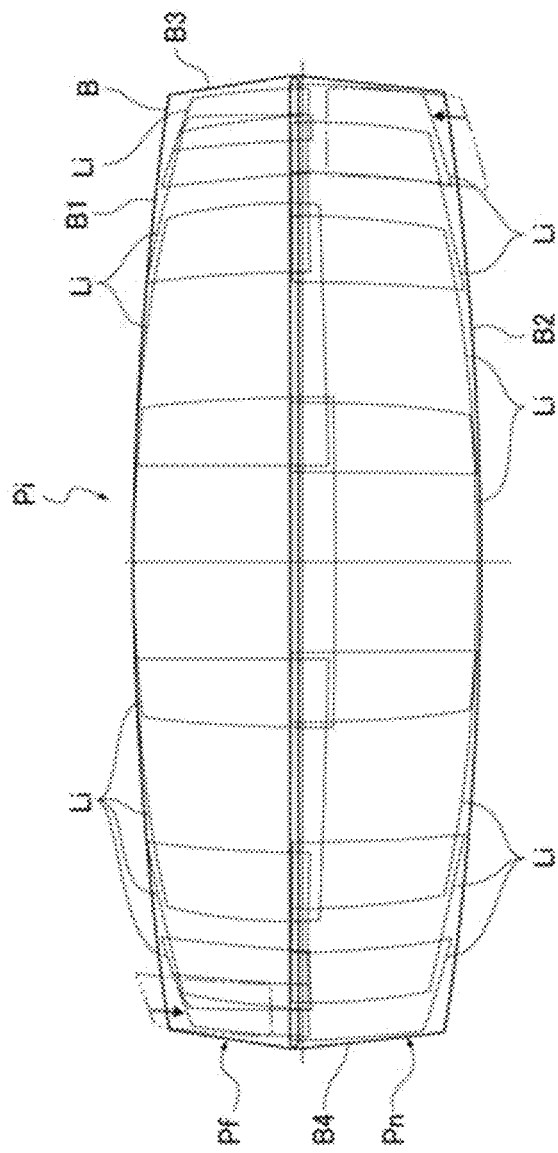
FIG. 10 is a diagram illustrating adjustment of the optical settings of a projection lens, and the relationship between multiple light distribution images of a light source and an illumination pattern on a screen.

The optical settings of the lens body 123 (the projection lens 112) will now be described with reference to FIGS. 10 to 12. FIG. 10 illustrates an illumination pattern Pi formed on a screen disposed orthogonally to the optical axis La, and the illumination pattern Pi has a shape different from that projected on the road surface 200. FIG. 12 illustrates the projection lens 112 with only the lens body 123, with the mounting portions 124 omitted. In the following, the direction orthogonal to the optical axis La is referred to as the radial direction. As illustrated in FIG. 10, the contour of the illumination pattern Pi formed on a projection target by the lens body 23 has a rectangular shape similar to that of the projection lens 112. In other words, the illumination pattern Pi is formed by being surrounded by four light-dark boundary lines B. The individual light-dark boundary lines B are as follows: the one on the upper side in the top-bottom direction is referred to as an upper boundary line B1, the one on the lower side in the top-bottom direction is referred to as a lower boundary line B2, the one on the right side in the width direction is referred to as a right boundary line B3, and the one on the left side in the width direction is referred to as a left boundary line B4. When the illumination pattern Pi is projected onto the road surface 200, it has a substantially trapezoidal shape as illustrated in FIG. 8 because the optical axis La tilts relative to the road surface 200.

The lens body 123 diverges the light flux of the light from the light source 21 passing through near the optical axis La in the radial direction in a transverse cross-section including the optical axis direction and the width direction, i.e., a transverse cross-section orthogonal to the top-bottom direction, and causes the light flux passing away from the optical axis La in the radial direction to be collimated. That is, the lens body 123 diffuses light in the vicinity of the optical axis La where the light intensity is high due to the Lambertian distribution, and focuses more light as the light passes father outward of the vicinity of the optical axis La. For this reason, the lens body 23 substantially equally disperses the light from the light source 121 in the transverse cross-section or width direction so as to have a substantially equal light intensity distribution, and also focuses the light on the right boundary line B3 and the left boundary line B4, which are the width-direction light-dark boundary lines B of the illumination pattern Pi formed by the projection, to emphasize the boundary lines B3 and B4.

Figure 11:
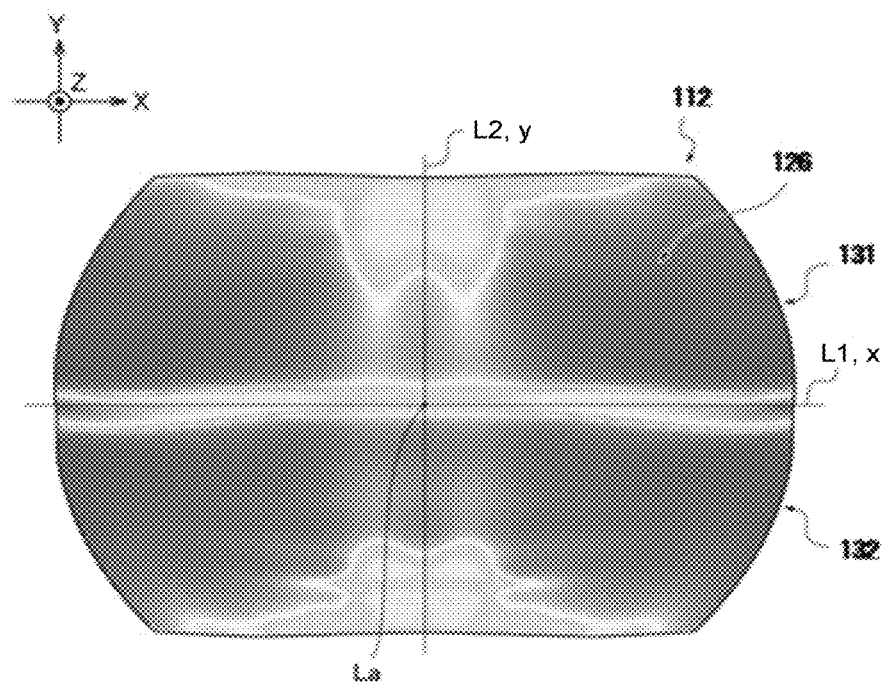
FIG. 11 is a diagram illustrating the shape of an output surface of a projection lens.
Figure 12:
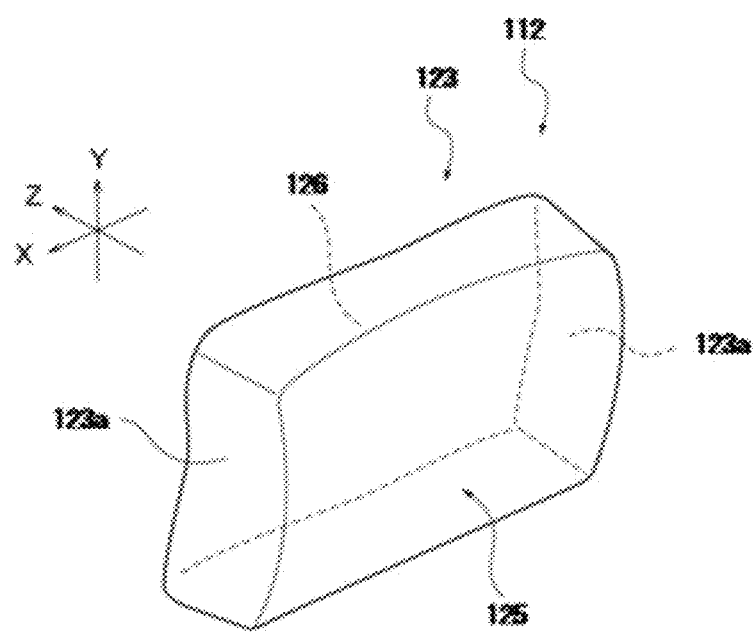
FIG. 12 is a diagram illustrating the shape of an incident surface of a projection lens. The shape is suitable for forming a diffused light distribution pattern.

As illustrated in FIG. 11, the lens body 123 is formed of an upper lens section 131 and a lower lens section 132 in the top-bottom direction with the optical axis La at the center. In the lens body 123, the upper lens section 131 forms a far-side pattern portion Pf (see FIG. 10) in the illumination pattern Pi, and the lower lens section 132 forms a near-side pattern portion Pn (see FIG. 10) in the illumination pattern Pi. The far-side pattern portion Pf is disposed on the side remote from the vehicle light fixture 100 (vehicle M), i.e., at a remote point of the illumination pattern Pi. The near-side pattern portion Pn is disposed on the side close to the vehicle light fixture 110 (vehicle M), i.e., at a near point of the illumination pattern Pi. The lens body 123 overlaps and projects the front end (the end on the near-side pattern portion Pn side) of the far-side pattern portion Pf formed by the upper lens section 131 and the back end (the end on the far-side pattern portion Pf side) of the near-side pattern portion Pn formed by the lower lens section 132, and forms a line portion Lp that has higher light intensity (that is brighter) than that of the peripheral portion at the overlapping portion.

The upper lens section 131 diverges the light flux of the light from the light source 21 passing through near the optical axis La in the radial direction in a longitudinal cross-section including the optical axis direction and the top-bottom direction, i.e., a longitudinal cross-section orthogonal to the width direction, and causes the light flux passing away from the optical axis La in the radial direction to be collimated. That is, the upper lens section 131 diffuses light in the vicinity of the optical axis La where the light intensity is high due to the Lambertian distribution, and focuses more light as the light passes farther outward of the vicinity of the optical axis La. For this reason, the upper lens section 131 substantially equally disperses the light from the light source 121 on the upper side of the longitudinal cross-section or top-bottom direction so as to have a substantially equal light intensity distribution, and also focuses the light on the upper boundary line B1, which is the upper one in the top-bottom direction of the width-direction light-dark boundary lines B of the far-side pattern portion Pf formed by the projection, to emphasize the upper boundary line B1.

The lower lens section 132 diverges the light flux of the light from the light source 121 passing through near the optical axis La in the radial direction on the longitudinal cross-section, and causes the light flux passing away from the optical axis La in the radial direction to be collimated. That is, the lower lens section 132 diffuses light in the vicinity of the optical axis La where the light intensity is high due to the Lambertian distribution, and focuses more light as the light passes father outward of the vicinity of the optical axis La. For this reason, the lower lens section 132 substantially equally disperses the light from the light source 121 on the lower side of the longitudinal cross-section or top-bottom direction so as to have a substantially equal light intensity distribution, and also focuses the light on the lower boundary line B2, which is the lower one in the top-bottom direction of the width-direction light-dark boundary lines B of the near-side pattern portion Pn formed by the projection, to emphasize the lower boundary line B2.

In this way, the illumination pattern Pi is formed by the far-side pattern portion Pf and the near-side pattern portion Pn. As illustrated in FIG. 10, the illumination pattern Pi forms a light-dark boundary lines B on the screen by appropriately overlapping multiple light distribution images Li of the light source 121. Here, each light distribution image Li is basically rectangular in shape due to the projection of the light source 121, but the position and shape of the light distribution image Li formed varies depending on the optical settings in the lens body 123. Since the lens body 23 is optically set as described above, it basically forms the illumination pattern Pi with the distribution described above; however, the respective light distribution images Li (their outer edges) may not be properly aligned with only the basic settings described above, and thus the light-dark boundary lines B may not be clear. Therefore, the lens body 123 is optically set so as to properly align each light distribution image Li forming an outer edge in the illumination pattern Pi. Here, the lens body 123 can adjust the position at which each light distribution image Li is formed on the screen by mainly adjusting the shape of the output surface 126, and can adjust the shape of each light distribution image Li by mainly adjusting the shape of the incident surface 25.

The output surface 126 adjusts the curvature (surface shape) of the corresponding portion so as to properly align each light distribution image Li defining the outer edge of the illumination pattern Pi on the screen and to form lines (light-dark boundary lines B) with the alignment of the outer edges of the respective light distribution images Li. That is, the curvature of the corresponding portion of the output surface 126 is adjusted so that the light distribution image Li that is shifted above the upper boundary line B1 is displaced downward, the light distribution image Li that is shifted below the lower boundary line B2 is displaced upward, the light distribution image Li that is shifted to the right of the right boundary line B3 is displaced leftward, and the light distribution image Li that is shifted to the left of the left boundary line B4 is displaced rightward. FIG. 10 illustrates the leftmost light distribution image Li, which is shifted above the upper boundary line B1 being displaced downward, and the rightmost light distribution image Li, which is shifted below the lower boundary line B2 being displaced upward.

The output surface 126 has the shape illustrated in FIG. 11 by the above settings. In FIG. 11, the darker the color, the greater the curvature and the relative protrusion, and the lighter the color, the smaller the curvature and the relative concavity. Here, a straight line extending in the width direction through the optical axis La is referred to as a width direction line L1, and a straight line extending in the top-bottom direction through the optical axis La is referred to as a top-bottom direction line L2. The output surface 126 is relatively concave around the width direction line L1 and around the top-bottom direction line L2, and relatively protrudes at the locations corresponding to the first to fourth quadrants when the width direction line L1 is the x-axis and the top-bottom direction line L2 is the y-axis. Since the output surface 126 is shaped in such a way, the illumination pattern Pi can be formed by appropriately arranging all of the light distribution images Li while forming lines in alignment with the outer edges of each light distribution image Li. This allows the lens body 123 to make the light-dark boundary lines B, which is emphasized by setting the basic light intensity distribution described above, more distinct. This is because lines are formed in alignment with the outer edges of each light distribution image Li and these lines serve as clear light-dark boundary lines B as a result of each light distribution image Li being placed inside the lines and not outside the lines.

The incident surface 125 adjusts the surface shape so that the distortion in each light distribution image Li is reduced on the screen. Here, the incident surface 125 has different shapes for the transverse cross-section and the longitudinal cross-section.

As illustrated in FIG. 12, the transverse cross-section of the incident surface 125 is a concave surface, that is, a curved surface projecting toward the side remote from the light source 121 (the front side in the optical axis direction). This is due to the fact that when the incident surface 125 is flat, the distortion in each light distribution image Li becomes larger than when the incident surface 125 is concave, and, when the incident surface 125 is convex, the distortion in each light distribution image Li becomes even larger.

The longitudinal cross-section of the incident surface 125 is a convex surface, that is, a curved surface projecting toward the light source 121 (the rear side in the optical axis direction). This is due to the fact that when the incident surface 125 is flat, the distortion in each light distribution image Li becomes larger than when the incident surface 125 is convex, and when the incident surface 125 is concave, the distortion in each light distribution image Li becomes even larger.

Thus, the incident surface 125 is a toroidal surface (toroidal lens) having different radii of curvature in the transverse cross-section or width direction, and in the longitudinal cross-section or vertical direction. Note that if the incident surface 125 is convex in the longitudinal cross section and concave in the transverse cross section, the respective radii of curvature (curvature) may be set appropriately. Since the incident surface 125 is shaped in such a way, the distortion of each light distribution image Li can be suppressed, and the illumination pattern Pi can be formed using the respective light distribution images Li. This allows the lens body 123 to make the illumination pattern Pi more desired in shape. This is because smaller distortion of each light distribution image Li makes it easier to appropriately arrange the light distribution images Li to the corners of the set light-dark boundary lines B while forming lines in alignment with the outer edges of each light distribution image Li as described above, compared with using each light distribution image Li having large distortion.

The vehicle light fixture 110 is assembled as follows with reference to FIG. 9. First, the light source unit 111 is assembled by mounting the light source 121 on the substrate 122 with the light source 121 positioned with respect to the substrate 122. Then, the respective mounting protrusions 127 of the two mounting portions 124 of the projection lens 112 are fitted into the corresponding mounting holes 122a in the substrate 122 of the light source unit 111 to fix the two mounting portions 124 to the substrate 122. Consequently, the light source unit 111 and the projection lens 112 are attached to each other so that the lens axis of the lens body 123 of the projection lens 112 is aligned with the optical axis La of the light source 121 of the light source unit 111 with a predetermined distance therebetween, to assemble the vehicle light fixture 100.

The vehicle light fixture 110 is installed in the light compartment in a state in which the optical axis La tilts with respect to the road surface 200 around the vehicle M while being directed to the side of the vehicle M (see FIG. 8). The vehicle light fixture 110 can appropriately turn on and off the light source 121 by supplying power from the lighting control circuit from the substrate 122 to the light source 121. As illustrated in FIG. 8, the light from the light source 121 is controlled and projected by the projection lens 112 to form an illumination pattern Pi having a line portion Lp on the road surface 200 by overlapping the front end of the far-side pattern portion Pf and the back end of the near-side pattern portion Pn. The illumination pattern Pi has a trapezoidal shape that widens from the vehicle M due to the optical axis La being tilted with respect to the road surface 200. The illumination pattern Pi can partially illuminate the road surface 200 on the left and right sides near the front edge of the vehicle M. The illumination pattern Pi is formed in conjunction with a turn lamp as an example in the first modification, and can inform the surrounding that the vehicle M is making a right or left turn.

Figure 13:
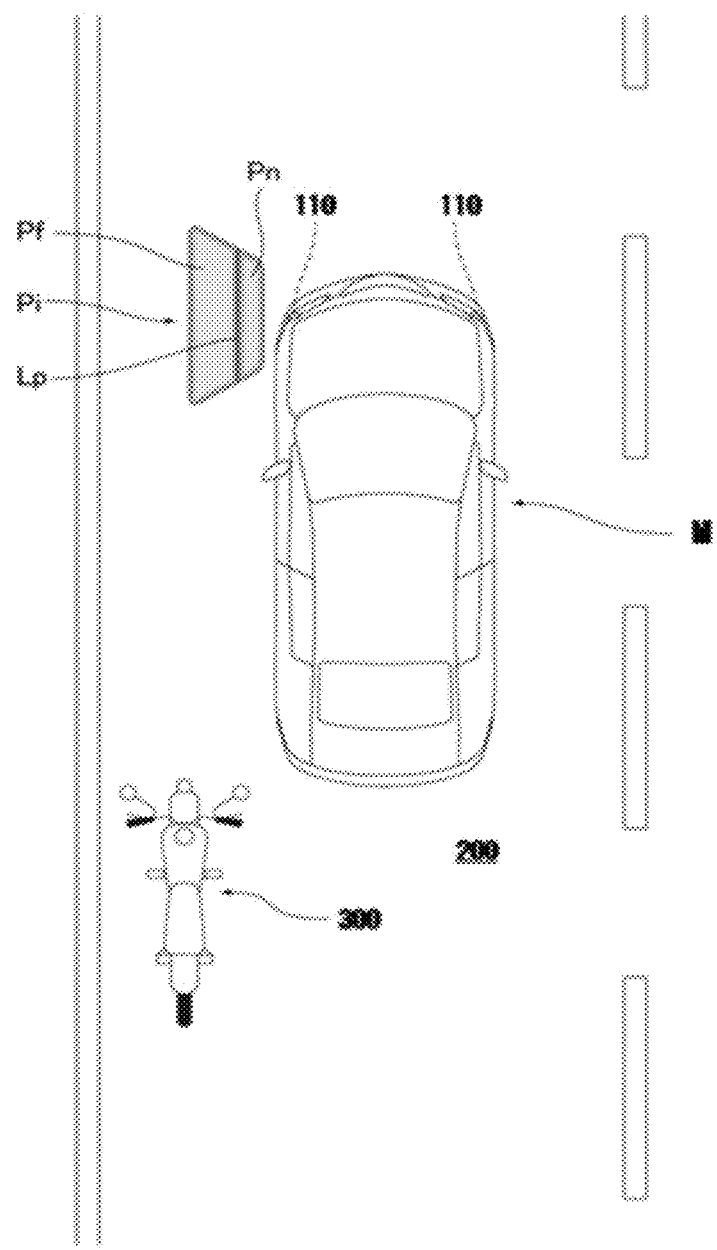
FIG. 13 is a diagram illustrating a usage example as an example of an illumination pattern formed by a vehicle light fixture.

The action of the vehicle light fixture 110 will now be explained with reference to FIG. 13. Note that, in FIG. 13, the motorcycle 300 is illustrated without its driver to facilitate understanding. The vehicle light fixture 110 is linked to the turn lamps, and when either the left or right turn lamp is turned on, the light source 121 corresponding to the turn lamp turned is turned on to form an illumination pattern Pi on the road surface 200. For example, FIG. 13 illustrates a scene in which the vehicle M is traveling straight down a road and is about to make a left turn. The left turn lamp of the vehicle M is flashed, and the vehicle light fixture 110 installed in front left side forms an illumination pattern Pi on the road surface 200. Then, the driver of the motorcycle 300 traveling behind the vehicle M can see the illumination pattern Pi formed on the road surface 200 even if he or she cannot see the turn lamp of the vehicle M, and thus can grasp that the vehicle M may turn left.

In the vehicle M, the left and right vehicle light fixtures 110 are linked to the turn lamps, and thus, when both turn lamps are turned on as hazard lamps, the left and right vehicle light fixtures 110 simultaneously form illumination patterns Pi on the road surface 200 (see FIG. 8). Therefore, the vehicle light fixtures 110 can make persons in the vicinity of the vehicle M to more reliably recognize that the vehicle light fixtures 110 are lit as hazard lamps than when only the left and right turn lamps are blinking.

Furthermore, since each projection lens 112 is optically set as described above, the vehicle light fixture 110 can focuses light to form an illumination pattern Pi in which the four light-dark boundary lines B defining the contour are made clear. Therefore, the vehicle light fixture 110 can make the shape of the illumination pattern Pi recognizable even without increasing the light intensity of the light source 121, and can convey some intention of the driver (the intension of turning right or left, for example, in the first modification) to persons in the vicinity with the formed illumination pattern Pi.

Here, the conventional vehicle light fixture described in the conventional art merely projects an illumination pattern onto the road surface in the vicinity of the vehicle, and do not emphasize the contour (light-dark boundary lines) of the illumination pattern. Therefore, the conventional vehicle light fixture forms a dimly glowing area as the illumination pattern, making it difficult to recognize the shape of the illumination pattern. Such an illumination pattern makes it difficult to determine whether it is formed by light from the vehicle or light from a source other than the vehicle, and thereby makes it difficult to convey some intention of the driver to those in the vicinity. In addition, the illumination pattern may express some intention of the driver by its shape, but if it is difficult to recognize the shape, it is still difficult to convey the intention. Therefore, the conventional vehicle light fixture may increase the light intensity of the light source to enable recognition of the shape of the illumination pattern, but this leads to an increase in the size of the overall configuration, an increase in power consumption, and addition of heat dissipating members as a result.

In contrast, in the vehicle light fixture 100 of the first modification, the projection lens 112 focuses the light from the light source 121 on each light-dark boundary line B of the illumination pattern Pi to emphasize it, and thereby makes each light-dark boundary line B of the illumination pattern Pi clear (see FIG. 8). The vehicle light fixture 110 can make an illumination pattern Pi (its shape) recognized more appropriately than an illumination pattern formed by the conventional vehicle light fixture, even when the illumination pattern Pi is formed with a brightness that is approximately equal to that of the conventional vehicle light fixture. Therefore, the vehicle light fixture 110 can make the illumination pattern Pi (its shape) recognized without increasing the light intensity of the light source 121 in comparison with the conventional vehicle light fixture. Since the vehicle light fixture 110 can make the persons in the surrounding recognize the illumination pattern Pi having an intended shape, it can appropriately convey some intention of the driver (such as a right or left turn in the first modification) to the persons in the surrounding.

In particular, since the light source 121 of the vehicle light fixture 110 of the first modification emits monochromatic light, the effect of chromatic aberration in the projection lens 12 can be greatly suppressed. Therefore, the vehicle light fixture 110 can form an illumination pattern Pi in which the respective light-dark boundary lines B are more vivid.

In addition, the vehicle light fixture 110 of the first modification forms a line portion Lp having higher light intensity (brighter) than that of the peripheral portion by overlapping, in the illumination pattern Pi, the front end of the far-side pattern portion Pf formed by the upper lens section 131 and a back end of the near-side pattern portion Pn formed by the lower lens section 132. Here, the conventional vehicle light fixture described above forms a line portion in the illumination pattern by installing a light source that forms the line portion in addition to the light source that forms the illumination pattern. Therefore, the vehicle light fixture 110 can form a line portion Lp in the illumination pattern Pi with a simple configuration including the light source unit 111 and the projection lens 112, without using a new light source like the conventional vehicle light fixture, so that the illumination pattern Pi can be more readily recognized.

The vehicle light fixture 110 of the first modification has diffusing portions 128 on the two side faces 123a of the lens body 123 and the outer side faces 124a of the respective mounting portions 124, which are the end surfaces in the left-right direction in the projection lens 112. Therefore, the vehicle light fixture 110 can diffuse the light from the light source 121 guided into the projection lens 112 by the diffusing portions 128 even when the light is emitted from the two side faces 123a of the lens body 123 and the outer side faces 124a of the respective mounting portions 124. Consequently, the vehicle light fixture 110 can prevent the light emitted from the two side faces 123a and the two outer side faces 124a from becoming leaking light that illuminates the illumination pattern Pi or an unintended area in the vicinity of the illumination pattern Pi. Therefore, the vehicle light fixture 110 can suppress blurring of each light-dark boundary line B by the leaking light, can more appropriately emphasize each light-dark boundary line B, and can appropriately form the illumination pattern Pi.

The vehicle light fixture 110 of the first modification can achieve each of the following effects.

The vehicle light fixture 110 includes a light source 121 and a projection lens 112 that projects light emitted from the light source 121 to form an illumination pattern Pi having multiple light-dark boundary lines B, wherein the projection lens 112 focuses light on at least some of the light-dark boundary lines B to emphasizes them. Therefore, the vehicle light fixture 110 can make at least some of the light-dark boundary lines B in the illumination pattern Pi clear, so that recognition of the shape of the illumination pattern Pi can be made easy. Since the vehicle light fixture 110 makes it easy to recognize the shape of the illumination pattern Pi by the light source unit 111 and the projection lens 112 without causing an increase in the light intensity of the light source 121, the vehicle light fixture 110 can have a simpler configuration than that of the conventional vehicle light fixture.

In the vehicle light fixture 110, the projection lens 112 focuses the light from the light source 121, inside the light-dark boundary lines B, and diffuses the light in other portions of the illumination pattern Pi. Therefore, the vehicle light fixture 110 can make it easy to control the light from the light source 121 by the projection lens 112 to form the illumination pattern Pi (its shape), and can more appropriately form the illumination pattern Pi.

In the vehicle light fixture 110, the output surface 126 of the projection lens 112 is a convex surface, and the area around the width direction line L1 passing through the optical axis La and the area around the top-bottom direction line L2 passing through the optical axis La are made concave relative to the other areas. Therefore, the vehicle light fixture 110 can position each light distribution image Li forming the illumination pattern Pi inside the emphasized light-dark boundary lines B, and can make the light-dark boundary lines B clearer.

In the vehicle light fixture 110, the incident surface 25 of the projection lens 112 is a convex surface in a cross-section orthogonal to the width direction and a concave surface in a cross-section orthogonal to the top-bottom direction. Therefore, the vehicle light fixture 110 can effectively suppress distortion in each light distribution image Li forming the illumination pattern Pi, and can more appropriately form the illumination pattern Pi.

In the vehicle light fixture 110, the projection lens 112 is formed from the upper lens section 131 and the lower lens section 132 in the top-bottom direction, the upper lens section 131 forms the far-side pattern portion Pf that is a remote portion in the illumination pattern Pi, and the lower lens section 132 forms the near-side pattern portion Pn that is the near portion in the illumination pattern Pi. The vehicle light fixture 110 overlaps the front end of the far-side pattern portion Pf and the back end of the near-side pattern portion Pn to form a line portion Lp having light intensity higher than that of the surrounding area in the illumination pattern Pi. Therefore, the vehicle light fixture 110 can form the line portion Lp in the illumination pattern Pi with a simple configuration including the light source unit 111 and the projection lens 112.

In the vehicle light fixture 110, diffusing portions 128 provided on the projection lens 112 on at least a portion other than the incident surface 125 and the output surface 126. Therefore, the vehicle light fixture 110 can suppress blurring of the emphasized light-dark boundary lines B by the leaking light, can more appropriately emphasize the light-dark boundary lines B, and can appropriately form the illumination pattern Pi.

Therefore, the vehicle light fixture 110 according to the first modification can facilitate the recognition of the shape of the illumination pattern Pi without causing an increase in the light intensity of the light source 121.

Note that in the first modification, the illumination pattern Pi has a rectangular shape having four light-dark boundary lines B. However, so long as the illumination pattern Pi is formed on the road surface 200 in the vicinity of the vehicle M to inform persons in the vicinity of some intention of the driver, and is polygonal in shape having multiple corners (including those chamfered into a sphere or the like) and multiple light-dark boundary lines B, the number and shape of the corners may be set appropriately; and the illumination pattern Pi is not limited to the configuration of the first modification described above.

Figure 14:
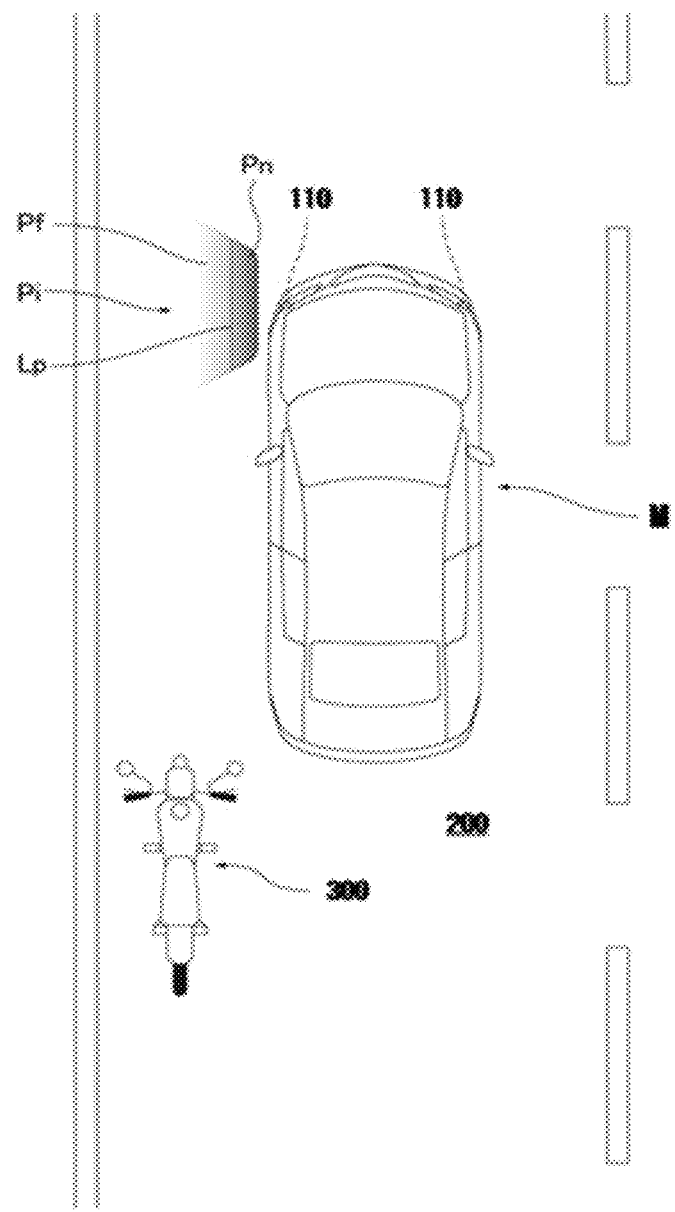
FIG. 14 is a diagram illustrating another example of a vehicle light fixture being mounted on a vehicle and forming an illumination pattern.

In the first modification, the projection lens 112 focuses light on four light-dark boundary lines B, i.e., all sides, of the rectangular-shaped illumination pattern Pi to emphasize the illumination pattern Pi. However, so long as the projection lens 112 focuses light on at least some of the respective light-dark boundary lines B of the illumination pattern Pi to emphasize the illumination pattern Pi, the range of the light-dark boundary lines B to be emphasized can be set appropriately and is not limited to the configuration of the first modification. In such a case, for example, by not emphasizing the side (one light-dark boundary line B) that is farthest from the vehicle M in the rectangular illumination pattern Pi as in the first modification, it is possible to indicate the illumination pattern Pi moving in a direction away from the vehicle M while making recognition of the shape of the illumination pattern Pi easy, as illustrated in FIG. 14.

Furthermore, in the first modification, diffusing portions 128 are disposed on the two side faces 123a of the lens body 123 and the outer side faces 124a of the respective mounting portions 124 in the projection lens 112. However, the diffusing portions 128 may be appropriately provided at locations other than the two side faces 123a and the two outer side faces 124a, so long as the locations are those other than the incident surface 125 and the output surface 126 of the projection lens 112 and those where light from the light source 121 guided into the projection lens 112 becomes leaked light, and the diffusing portions 128 are not limited to the configuration of the first modification described above.

In the first modification, the projection lens 112 overlaps and projects the front end of the far-side pattern portion Pf and the back end of the near-side pattern portion Pn to form the illumination pattern Pi having the line portion Lp. However, so long as the projection lens 112 projects the light emitted from the light source 121 to form the polygon-shaped illumination pattern Pi having multiple light-dark boundary lines B, the projection lens 112 may not form the line portion Lp, may form a line portion Lp having another shape, and is not limited to the configuration of the first modification. The position and shape of the line portion Lp can be set by adjusting the shape of the front end of the far-side pattern portion Pf and the back end of the near-side pattern portion Pn, and the line portion Lp may be, for example, a curved line or a bent line.

[Second Modification]

A detailed configuration of a vehicle light fixture will now be described as a further modification of the sub-light distribution illuminator 30A illustrated in FIG. 6 with reference to the drawings. This second modification is an example of a vehicle light fixture that forms a polygonal illumination pattern having multiple light-dark boundary lines, but different from that of the first modification. Note that components similar to those of the first modification are denoted by the same reference signs, and their descriptions are omitted unless particularly necessary.

Figure 15:
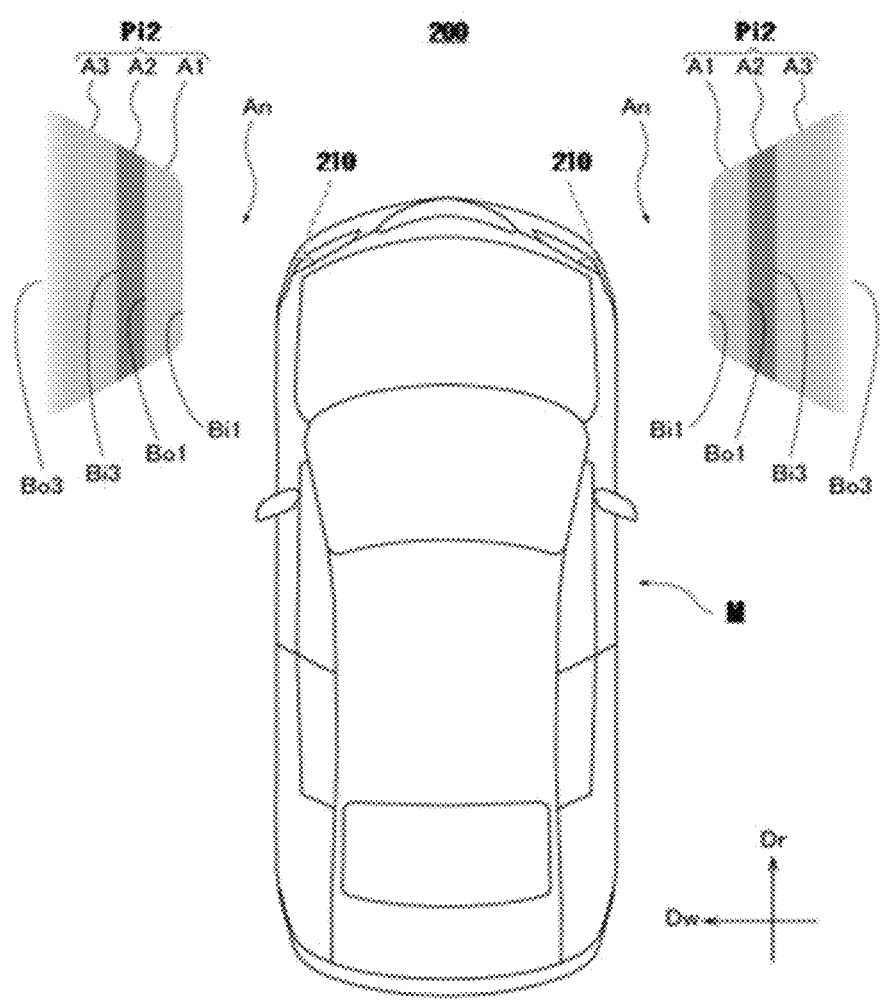
FIG. 15 is a diagram illustrating a vehicle light fixture according to a second modification of the disclosure being mounted on a vehicle and forming an illumination pattern.

Similar to the first modification, also in the second modification in FIG. 15, the size of vehicle light fixtures 210 relative to the vehicle M is exaggerated in order to facilitate understanding of how the vehicle light fixtures 210 of this modification are installed, and does not necessarily correspond to the actual appearance. In the graph shown on the bottom of FIG. 17, the vertical axis is the illuminance, and the horizontal axis is the position in an illumination pattern Pi2 and its vicinity shown on the top of the drawing in the width direction. FIGS. 21 to 26 illustrate only the selected light distribution images Li are illustrated to facilitate understanding of how each illuminated area (A1, A2, A3) of the illumination pattern Pi2 is formed by each light distribution image Li, and do not necessarily correspond to the actual appearance. FIGS. 21 to 26 illustrate the contour positions set as the illumination pattern Pi2 (the respective illuminated areas) on the screen, together with arrows indicating the traveling direction and the width direction when the illumination pattern Pi2 is formed on the road surface 200 on the left side of the vehicle M. The same is true for FIG. 18 with respect to this arrow.

The vehicle light fixture 210 according to the second modification will be described with reference to FIGS. 15 to 27. As illustrated in FIG. 15, the vehicle light fixtures 210 of the second modification are used as light fixtures of a vehicle M, such as an automobile, and form illumination patterns Pi2 on a road surface 200 in the vicinity of the vehicle M, separately from front light fixtures provided on the vehicle M. Here, the vicinity of the vehicle M always includes a proximity area closer to the vehicle M than the front light areas illuminated by the front lights provided on the vehicle M, and may partially include the front light areas. The vehicle light fixture 210 is disposed in a light compartment of the vehicle M, a door mirror, a side surface of the vehicle body, or the like, and in the second modification, vehicle light fixtures 210 are disposed in light compartments on the left and right front sides of the vehicle. The light compartments are each formed by an open front end of a lamp housing being covered by an outer lens. The vehicle light fixture 210 is provided with the optical axis La tilting relative to the road surface 200. This is due to the light compartment being positioned higher than the road surface 200.

Figure 16:
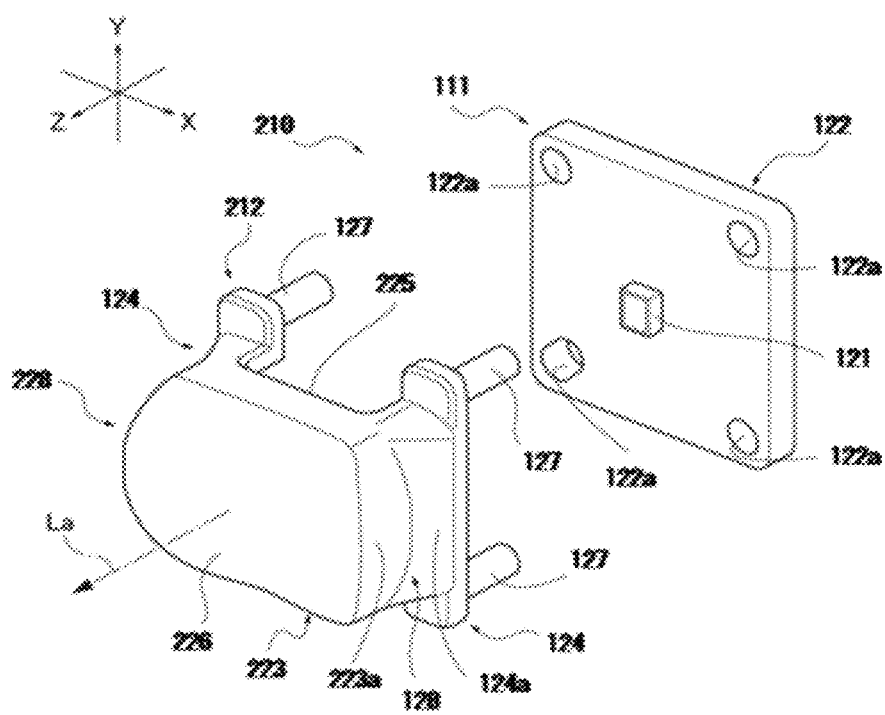
FIG. 16 is a diagram illustrating the configuration of the vehicle light fixture of the second modification.

In the following description, on the road surface 200 in the vicinity of the vehicle M, the direction in which the vehicle M travels is referred to as the traveling direction (denoted by Dr in the drawing), and the direction orthogonal to the traveling direction is referred to as the width direction (denoted by Dw in the drawing), as illustrated in FIG. 15. In the vehicle light fixture 210 as illustrated in FIG. 16, the direction in which the optical axis La extends or the direction in which light is emitted is defined as the optical axis direction (Z in the drawing), the vertical direction when the optical axis direction is along a horizontal plane is defined as the top-bottom direction (Y in the drawing), and the direction orthogonal to the optical axis direction and the top-bottom direction (horizontal direction) is defined as the left-right direction (X in the drawing).

The vehicle light fixture 210 is an assembly of a light source unit 111 and a projection lens 212, and constitutes a direct projection type road-surface projection unit. The vehicle light fixture 210 is installed in the vehicle M with the light source unit 111 and the projection lens 212 assembled and housed in a suitable housing.

A lens body 223 forms an illumination pattern Pit on a projection target (the road surface 200 of the second modification) by projecting light from the light source 121 while shaping it, and an incident surface 225 and an output surface 226 are each a single free curved surface, i.e., a surface having a curvature that smoothly changes without steps. The optical settings in the lens body 223 (the projection lens 212) will be described later. The projection lens 212 has a lens axis extending in the optical axis direction. The lens axis is an axis that is the optical center in the lens body 223.

The vehicle light fixture 210 forms illumination patterns Pi2 symmetrically with respect to a plane orthogonal to the width direction of the vehicle M on the left and right sides of the vehicle M, as illustrated in FIG. 15. Each illumination pattern Pi2 has a first illuminated area A1, a second illuminated area A2, and a third illuminated area A3 in order from the inside in the width direction (the side of the vehicle M or the light source 121), and each of the illuminated areas extends in the traveling direction. That is, the illumination pattern Pi2 is formed by three line-shaped illuminated areas extending in the traveling direction in parallel in the width direction. The vehicle light fixture 210 forms a non-illuminated area An that is not illuminated inside the illumination pattern Pi2 (its first illuminated area A1) by being spaced from the vehicle M in which the vehicle light fixture 210 is mounted. The setting of the illumination pattern Pi2 will be described with reference to FIG. 17. The illumination pattern Pi2 can be set by adjusting the illumination pattern Pi2 on the screen (see FIG. 18) while taking into consideration the distance and angle from the vehicle light fixture 210 on the vehicle M to the road surface 200.

Figure 17:
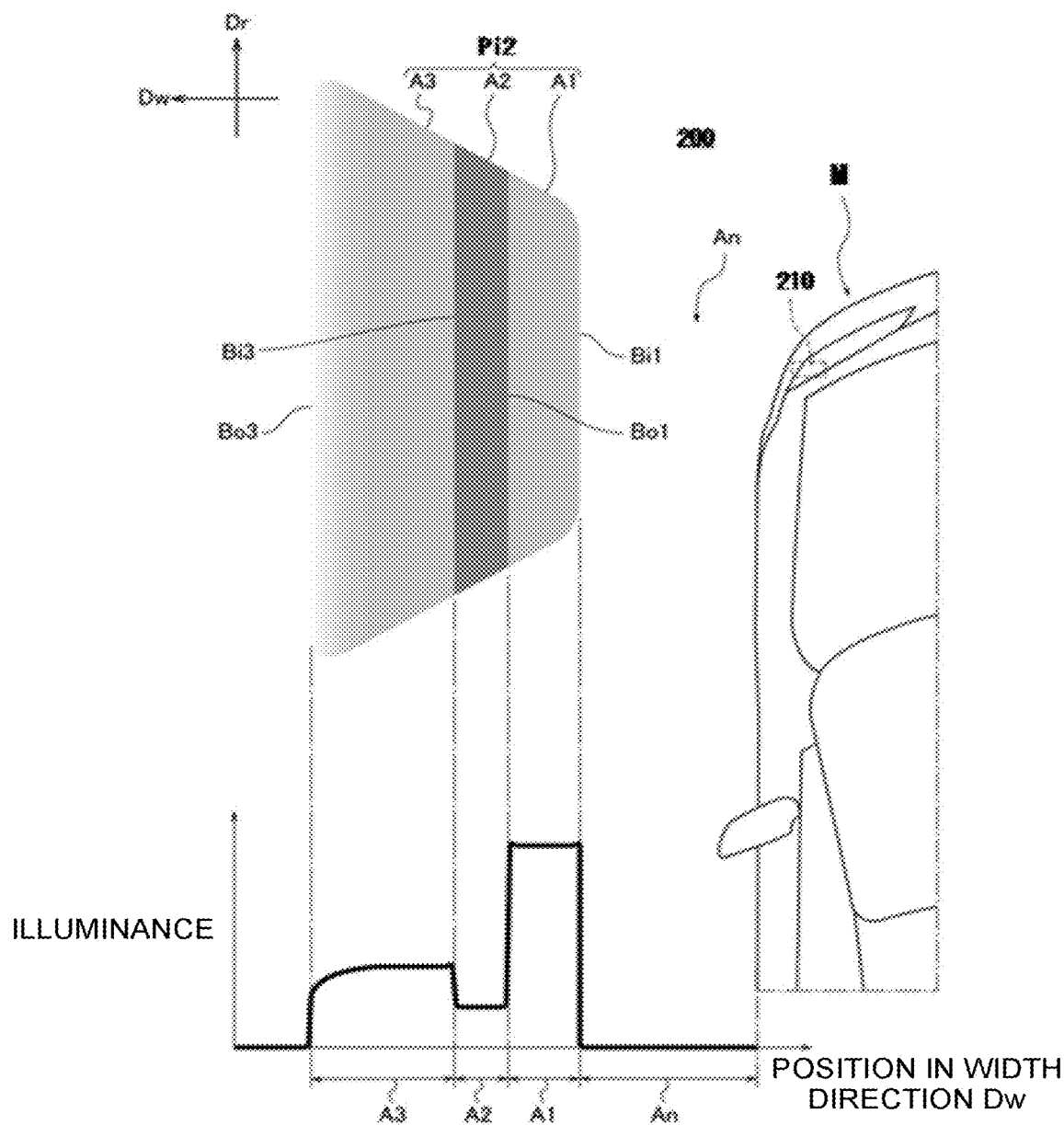
FIG. 17 is a graph for explaining the setting of the illumination pattern, wherein the top area indicates an illumination pattern formed on a road surface, and the bottom area indicates a change in illuminance in the width direction on the road surface including the illumination pattern.

As illustrated in FIG. 17, the illumination pattern Pi2 makes the first illuminated area A1 the brightest, the second illuminated area A2 the darkest, and the third illuminated area A3 the brightness between them. Note that the third illuminated area A3 may alternatively be of equal brightness to the first illuminated area A1. Even though the second illuminated area A2 is the darkest one in the illumination pattern Pi2, the second illuminated area A2 is formed by light emission and illuminates the road surface 200 in a strip extending in the traveling direction. Therefore, the first illuminated area A1, the second illuminated area A2, and the third illuminated area A3 in the illumination pattern Pi2, which is formed on the unilluminated road surface 200 with zero illuminance, shine brightly.

In the illumination pattern Pi2, the dimension in the width direction is the smallest for the second illuminated area A2, larger for the first illuminated area A1, and the largest for the third illuminated area A3. The dimension of the first illuminated area A1 is set in a width direction from the viewpoint of making it easy to be seen by a driver of a vehicle, etc., and in the second modification, the dimension of the first illuminated area A1 is set in the width direction equal to that of a white line serving as a demarcation line formed on the road surface 200. The dimension of the first illuminated area A1 together with the non-illuminated area An in the width direction is the minimum value that allows a motorcycle 300, such as a motorcycle or a bicycle, to pass by the vehicle M.

Then, as example of the dimensions in the width direction of the illumination pattern Pi2, the first illuminated area A1 is 20 cm, the second illuminated area A2 is 15 cm, and the third illuminated area A3 is 40 cm. The distance between the illumination pattern Pi2 and the vehicle M, that is, the dimension of the non-illuminated area An in the width direction is within the range of 30 to 50 cm. Therefore, in the illumination pattern Pi2, the combined dimension of the first illuminated area A1 and the non-illuminated area An in the width direction is within the range of 50 to 80 cm.

Figure 18:
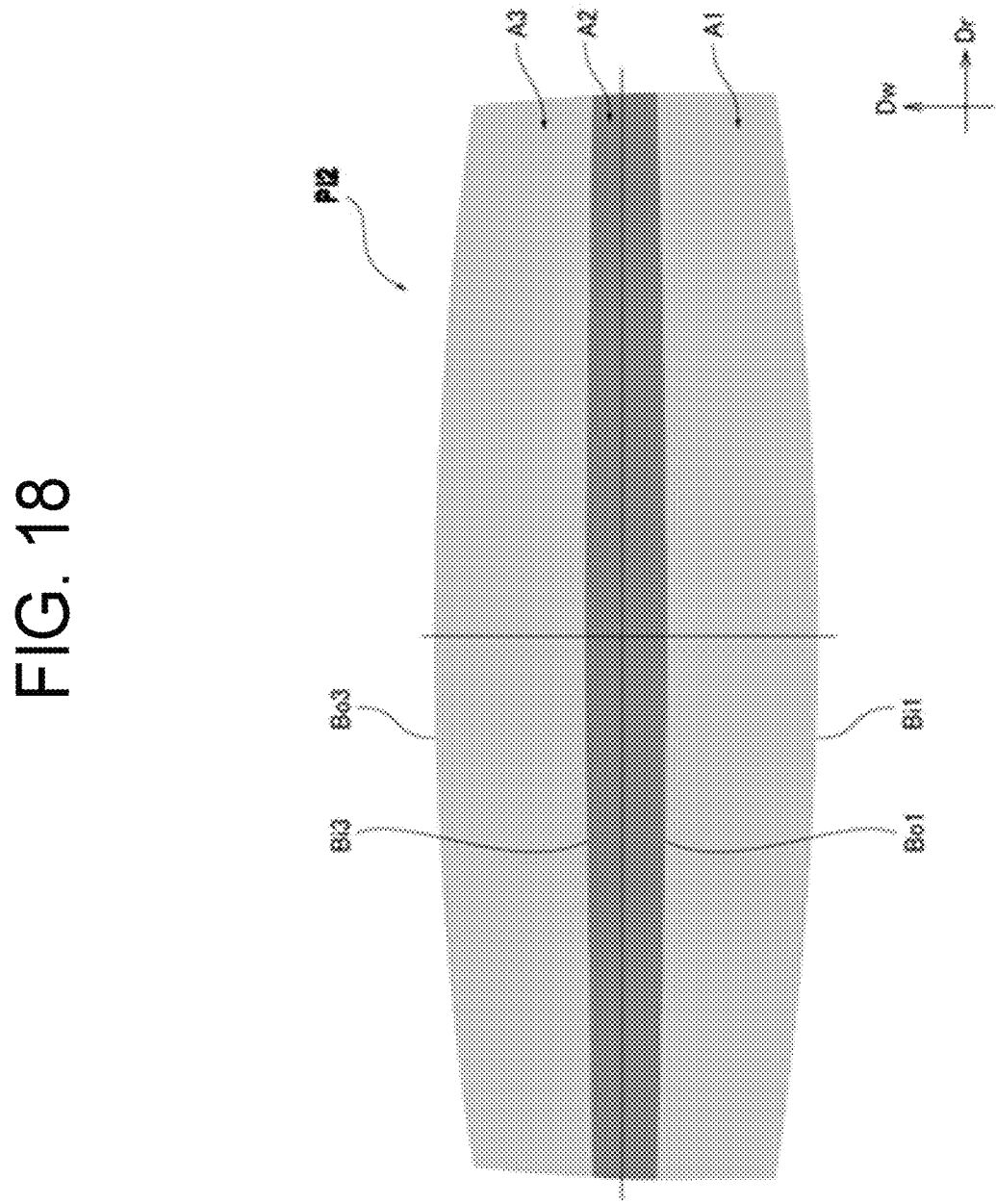
FIG. 18 is a diagram illustrating an illumination pattern projected onto a screen by a vehicle light fixture.

The optical settings of the lens body 223 (the projection lens 212) will now be described with reference to FIGS. 18 to 26. FIG. 18 illustrates an illumination pattern Pi2 formed on a screen disposed orthogonally to the optical axis La, and the illumination pattern Pi2 has a shape different from that projected on the road surface 200 (see FIG. 15). In FIG. 18, the longitudinal direction (left-right direction when viewed from the front) of the illumination pattern Pi2 corresponds to the traveling direction, the short direction (up-down direction when viewed from the front) corresponds to the width direction, and the lower side corresponds to the inner side of the width direction. As illustrated in FIG. 18, the illumination pattern Pi2 has a contour line (shape) of a rectangle shape on the screen. In the illumination pattern Pi2, the first illuminated area A1 extends in the traveling direction at the bottom, the second illuminated area A2 extends in the traveling direction above the first illuminated area A1, and the third illuminated area A3 is disposed above the second illuminated area A2. When the illumination pattern Pi2 is projected onto the road surface 200, it has a substantially trapezoidal shape (an inverted trapezoidal shape when viewed from the vehicle M side) as illustrated in FIGS. 15 and 17 because the optical axis La tilts relative to the road surface 200. The lens body 223 is optically set to form such an illumination pattern Pi2 on the screen.

Figure 19:
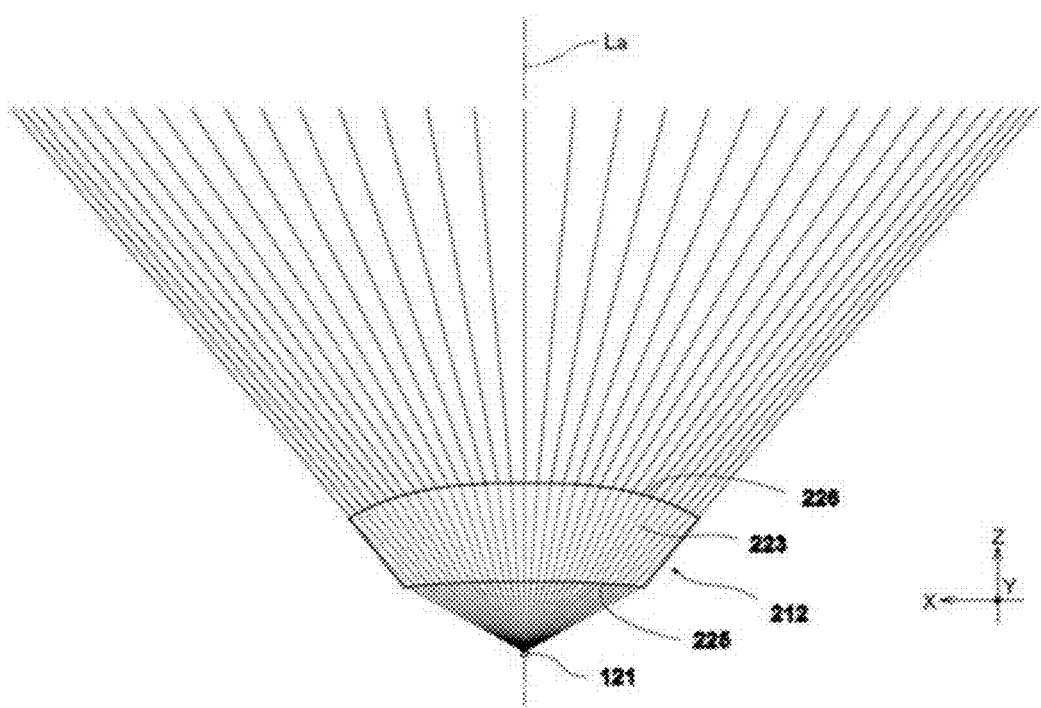
FIG. 19 is a diagram illustrating the progression of light passing through a projection lens on a cross-section including the optical axis in a vehicle light fixture.

As illustrated in FIG. 19, of the light from the light source 121, the lens body 223 diffuses the light (light ray group) passing through near the optical axis La and collimates the light (light ray group) passing a position away from the optical axis La in a transverse cross-section including the optical axis direction and the left-right direction, i.e., a transverse cross-section orthogonal to the top-bottom direction. That is, the lens body 223 diffuses light in the vicinity of the optical axis La where the light intensity is high clue to the Lambertian distribution, and focuses more light as the light passes father outward of the vicinity of the optical axis La. Therefore, the lens body 223 disperses the light from the light source 121 in a transverse cross-section, i.e., in the left-right direction, in a substantially equal manner so as to have a substantially equal light intensity distribution. Note that the lens body 223 may focus light on the two boundary lines (inside the boundary lines) positioned in the left-right direction of the illumination pattern Pit to make the two boundary lines clear.

Figure 20:
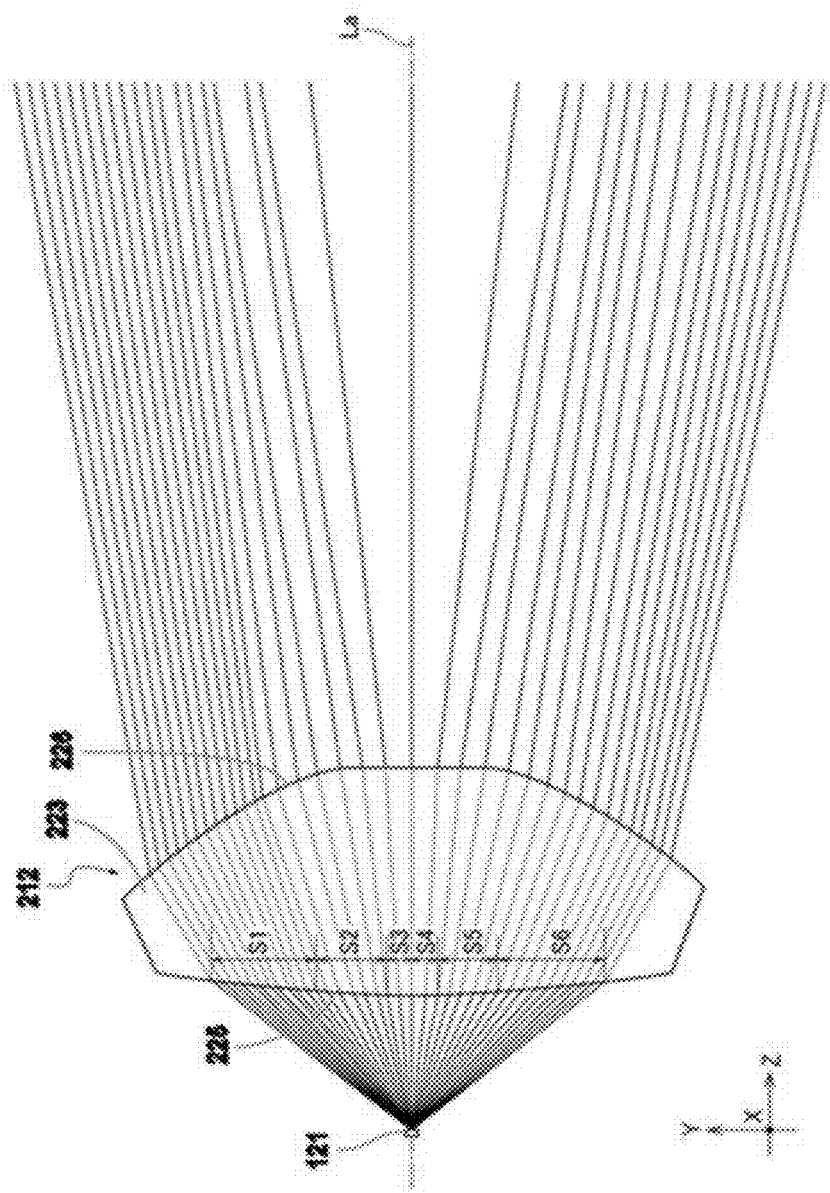
FIG. 20 is a diagram illustrating the progression of light passing through a projection lens in a longitudinal cross-section including the optical axis in a vehicle light fixture and six optical regions divided in the top-bottom direction.

As illustrated in FIG. 20, the lens body 223 is divided into six optical regions in a longitudinal cross-section including the optical axis direction and the vertical direction, i.e., a longitudinal cross-section orthogonal to the left-right direction. The respective optical regions are referred to, in order from the top, a first optical region S1, a second optical region S2, a third optical region S3, a fourth optical region S4, a fifth optical region S5, and a sixth optical region S6. The respective optical regions (S1 to S6) are defined by the angle of incidence from the light source 21 to the incident surface 225 of the lens body 223 in the top-bottom direction (longitudinal cross-section) with reference to the optical axis La.

In detail, the first optical region S1 is a region in which the angle of incidence is farther outward than 30 degrees (on the upper side in the top-bottom direction) around the optical axis La, and in the second modification, the first optical region S1 is the region in which the angle of incidence is within the range of 30 to 50 degrees. The second optical region S2 is the region in which the angle of incidence is within the range of 10 and 30 degrees. The third optical region S3 is the region in which the angle of incidence is within the range of 0 and 10 degrees. The fourth optical region S4 is the region in which the angle of incidence is within the range of −10 and 0 degrees. The fifth optical region S5 is the region in which the angle of incidence is within the range of −30 and −10 degrees. The sixth optical region S6 is the region in which the angle of incidence is farther outward than −30 degrees (on the lower side in the top-bottom direction) around the optical axis La, and in the second modification, the sixth optical region SG is the region in which the angle of incidence is within the range of −50 to −30 degrees. Therefore, the first optical region S1 is the upper end region, the second optical region S2 is the upper region, the third optical region S3 and the fourth optical region S4 are the central regions, the fifth optical region S5 is the lower region, and the sixth optical region S6 is the lower end region. Note that among the respective optical regions (S1 to S6), adjacent optical regions may both include the angle (30, 10, −10, or −30 degrees) that defines their boundary, and this can be set as appropriate.

The respective optical regions (S1 to S6) form an illumination pattern Pi2 by projecting the light from the light source 121 in accordance with the respective optical settings. Here, the illumination pattern Pi2 is formed by appropriately overlapping multiple light distribution images Li of the light source 121 on the screen as illustrated in FIGS. 21 to 26. Each light distribution image Li is basically rectangular in shape due to the projection of the light source 121, but the position and shape of the light distribution image Li formed varies depending on the optical settings in the lens body 223. The lens body 223 then sets a portion of the illumination pattern Pi2 corresponding to each optical area and optically sets each optical region in accordance with the corresponding portion.

Here, the lens body 223 adjusts the position at which each light distribution image Li is formed on the screen by mainly adjusting the shape of the output surface 226, and adjusts the shape of each light distribution image Li by mainly adjusting the shape of the incident surface 225. Therefore, the lens body 223 adjusts mainly the curvature (surface shape) of the output surface 226 to establish the optical settings in the above-described transverse cross-section and the optical settings in the longitudinal cross-section described below. The optical setting for the output surface 226 is established by gradually changing the curvature, and thereby the output surface 226 is a smooth, step-free single surface.

Figure 21:
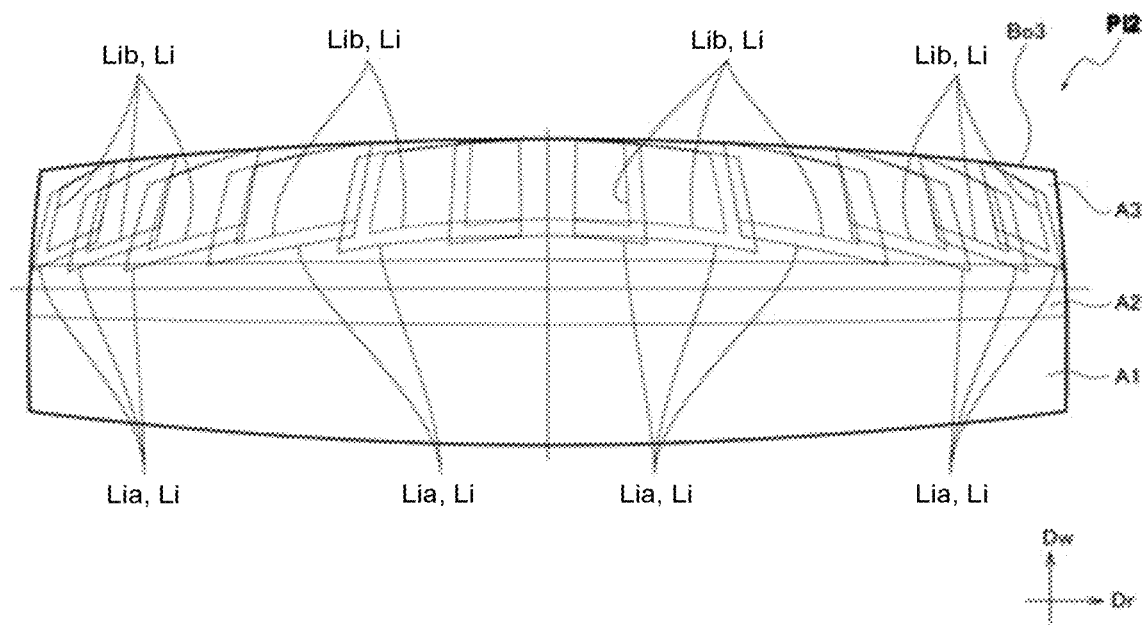
FIG. 21 is a diagram illustrating the optical setting of a projection lens, and illustrates the relationship between the contour position of the illumination pattern and multiple light distribution images produced by light passing through a first optical region on a screen.
Figure 22:
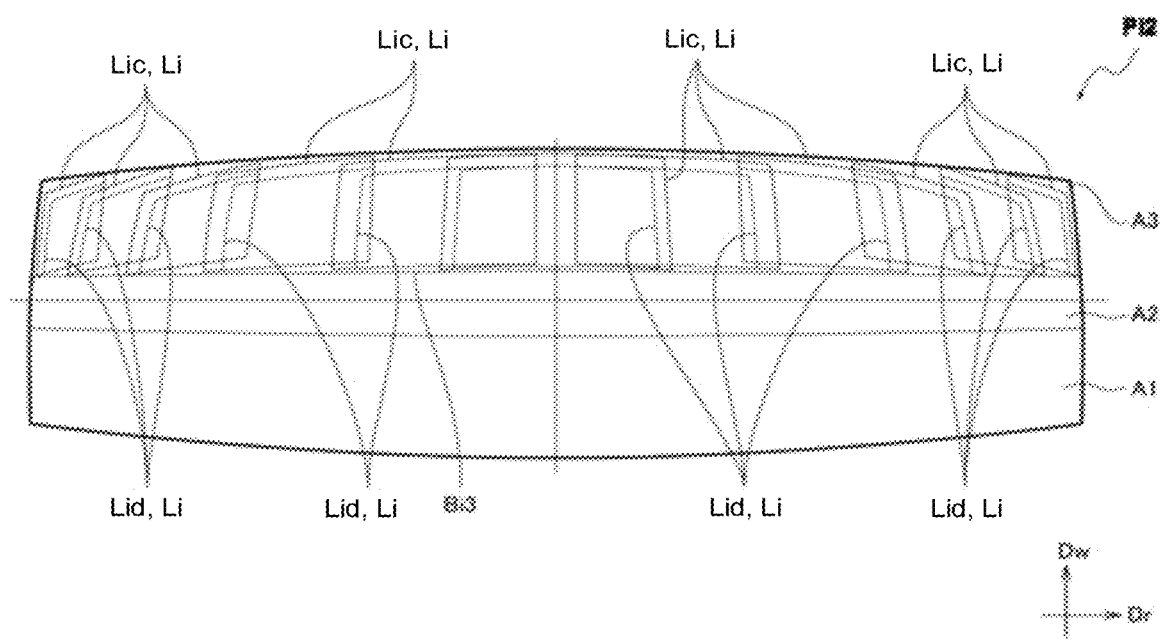
FIG. 22 is a diagram similar to FIG. 21, and illustrates the relationship between the contour position of the illumination pattern and multiple light distribution images produced by light passing through a second optical region on a screen.

The first optical region S1 forms the third illuminated area A3 of the illumination pattern Pi2 as well as a third outer boundary line Bo3 outside the third illuminated area A3 (outside the illumination pattern Pi2, on the side remote from the light source 121). In the first optical region S1, the curvature of the output surface 226 is set so as to diffuse the light (light ray group) passing through near an incident angle of 30 degrees among the light from the light source 121, to reduce the degree of diffusion as the incident angle increases, and to substantially collimate the light (light ray group) passing through near an incident angle of 50 degrees. That is, the first optical region S1 diffuses light in the vicinity of an incident angle of 30 degrees and focuses light as the incident angle approaches 50 degrees. Therefore, the first optical region S1 is sized so that the light distribution images Li of the light passing through near an angle of incidence of 30 degrees cover substantially the entire third illuminated area A3 in the width direction (reference sign Lia), as illustrated in FIG. 21. In the first optical region S1, the light distribution images Li of the light passing through near an angle of incidence of 50 degrees have a size corresponding to a portion of the third illuminated area A3 in the width direction and are positioned outward (upper side in FIG. 21 when viewed from the front) in the width direction of the third illuminated area A3 (reference sign Lib).

Consequently, the first optical region S1 projects the light distribution images Li in the third illuminated area A3 and aligns the outer edges of the light distribution images Li to form the third outer boundary line Bo3. Here, in the first optical region S1, when there is a light distribution image Li shifted farther outward in the width direction than the third outer boundary line Bo3, the curvature of the output surface 226 in the corresponding area is adjusted to appropriately align the light distribution images Li. Consequently, in the first optical region S1, while the third illuminated area A3 is emitted, light is connected on the third outer boundary line Bo3 to clarify the difference in lightness and darkness between the third illuminated area A3 and the outside thereof (outside of the illumination pattern Pi2), and thereby making the third outer boundary line Bo3 clear.

In the second optical region S2, the third illuminated area A3 of the illumination pattern Pi2 is formed, and a third inner boundary line Bi3 on the inner side (the side close to the second illuminated area A2) of the third illuminated area A3. In the second optical region S2, the curvature of the output surface 226 is set so as to diffuse the light (light ray group) passing through near an incident angle of 30 degrees among the light from the light source 121, to reduce the degree of diffusion as the incident angle decreases, and to substantially collimate the light (light ray group) passing through near an incident angle of 10 degrees. That is, the second optical region S2 diffuses light in the vicinity of an incident angle of 30 degrees and focuses light as the incident angle approaches 10 degrees. Therefore, the second optical region S2 is sized so that the light distribution images Li of the light passing through near an angle of incidence of 30 degrees cover substantially the entire third illuminated area A3 in the width direction (reference sign Lic), as illustrated in FIG. 17. In the second optical region S2, the light distribution images Li of the light passing through near an angle of incidence of 10 degrees have a size corresponding to a portion of the third illuminated area A3 in the width direction and are positioned inward (lower side in FIG. 21 when viewed from the front) in the width direction of the third illuminated area A3 (reference sign Lid).

Consequently, the second optical region S2 projects the light distribution images Li in the third illuminated area A3 and aligns the inner edges of the light distribution images Li to form the third inner boundary line Bi3. Here, in the second optical region S2, when there is a light distribution image Li shifted farther inward in the width direction than the third inner boundary line Bi3, the curvature of the output surface 226 in the corresponding area is adjusted to appropriately align the light distribution images Li. Consequently, in the second optical region S2, while the third illuminated area A3 is emitted, light is connected on the third inner boundary line Bi3 to clarify the difference in lightness and darkness between the third illuminated area A3 and the second illuminated area A2, and thereby making the third inner boundary line Bi3 clear.

In the third optical region S3, mainly the second illuminated area A2 and the third illuminated area A3 of the illumination pattern Pi2 are formed. In the third optical region S3, the curvature of the output surface 226 is set so as to diffuse the light (light ray group) passing through near the optical axis La among the light from the light source 121, to reduce the degree of diffusion as the incident angle increases. That is, the third optical region S3 significantly diffuses light in the vicinity of the optical axis La and decreases the degree of diffusion as the incident angle approaches 10 degrees.

Figure 23:
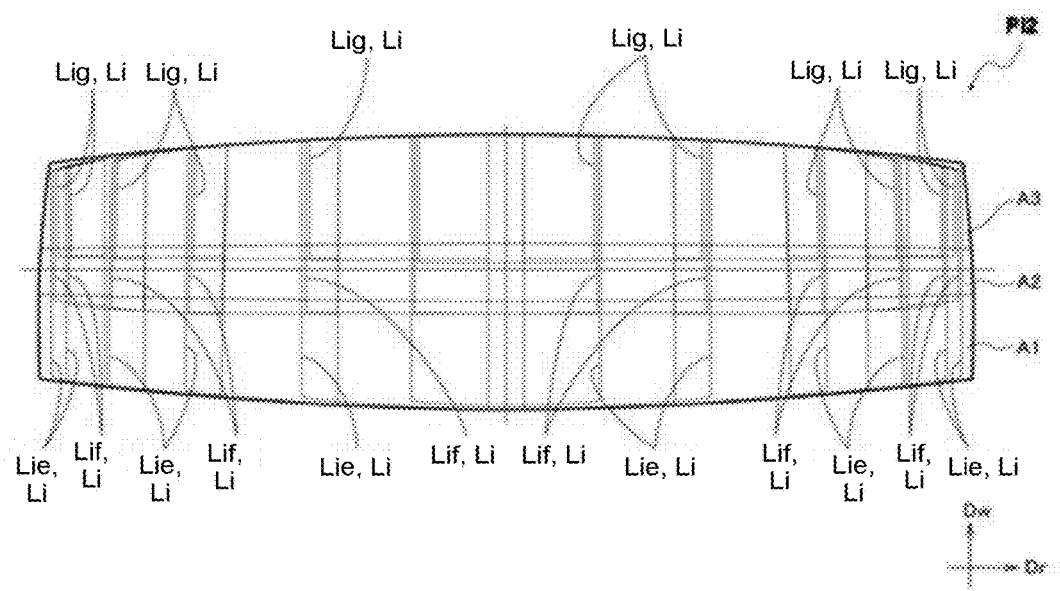
FIG. 23 is a diagram similar to FIG. 21, and illustrates the relationship between the contour position of the illumination pattern and multiple light distribution images produced by light passing through a third optical region on a screen.

Therefore, the third optical region S3 is sized so that the light distribution images Li of the light passing through near the optical axis La cover the entire third illuminated area A3 in the width direction (reference sign Lie) through the first illuminated area A1 and the second illuminated area A2, as illustrated in FIG. 23. The third optical region S3 is sized so that the light distribution images Li of the light passing through a position away from the optical axis La and corresponding to an angle of incidence smaller than 10 degrees slightly overlap with the first illuminated area A1 in the width direction and entirely cover the second illuminated area A2 and the third illuminated area A3 (reference sign Lif). The third optical region S3 is sized so that the light distribution images Li of the light passing through near an angle of incidence of 10 degrees slightly overlap with the second illuminated area A2 in the width direction and entirely cover the third illuminated area A3 (reference sign Lig). Consequently, the third optical region S3 always illuminates at least a portion of the second illuminated area A2 while extensively illuminating a range from the first illuminated area A1 to the third illuminated area A3.

The fourth optical region S4 is reversed in the top-bottom direction from the third optical region S3, and mainly forms the second illuminated area A2 and the first illuminated area A1 of the illumination pattern Pi2. In the fourth optical region S4, the curvature of the output surface 226 is set so as to diffuse the light (light ray group) passing through near the optical axis La among the light from the light source 121, to reduce the degree of diffusion as the incident angle decreases. That is, the fourth optical region S4 significantly diffuses light in the vicinity of the optical axis La and decreases the degree of diffusion as the incident angle approaches −10 degrees.

Figure 24:
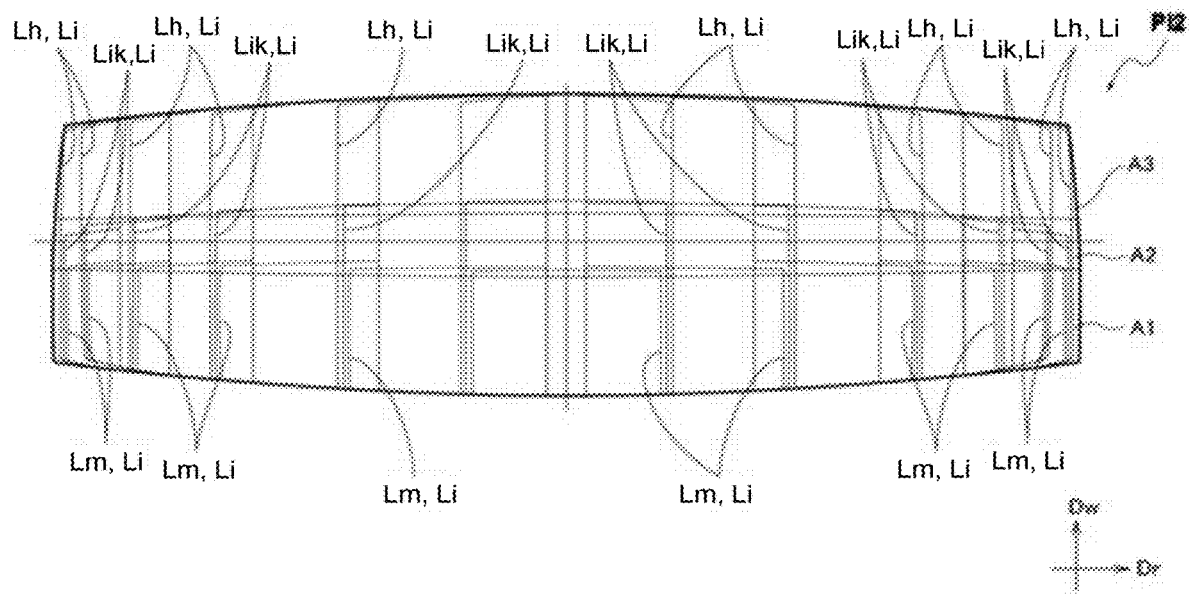
FIG. 24 is a diagram similar to FIG. 21, and illustrates the relationship between the contour position of the illumination pattern and multiple light distribution images produced by light passing through a fourth optical region on a screen.

Therefore, the fourth optical region S4 is sized so that the light distribution images Li of the light passing through near the optical axis La cover the entire first illuminated area A1 in the width direction (reference sign Lih) through the third illuminated area A3 and the second illuminated area A2, as illustrated in FIG. 24. The fourth optical region S4 is sized so that the light distribution images Li of the light passing through a position corresponding to an angle of incidence of more than −10 degrees and away from the optical axis La slightly overlap with the third illuminated area A3 in the width direction and entirely cover the second illuminated area A2 and the first illuminated area A1 (reference sign Lik). The fourth optical region S4 is sized so that the light distribution images Li of the light passing through near an angle of incidence of 10 degrees slightly overlap with the second illuminated area A2 in the width direction and entirely cover the first illuminated area A1 (reference sign Lim). Consequently, the fourth optical region S4 always illuminates at least a portion of the second illuminated area A2 while extensively illuminating a range from the third illuminated area A3 to the third illuminated area A3.

Figure 25:
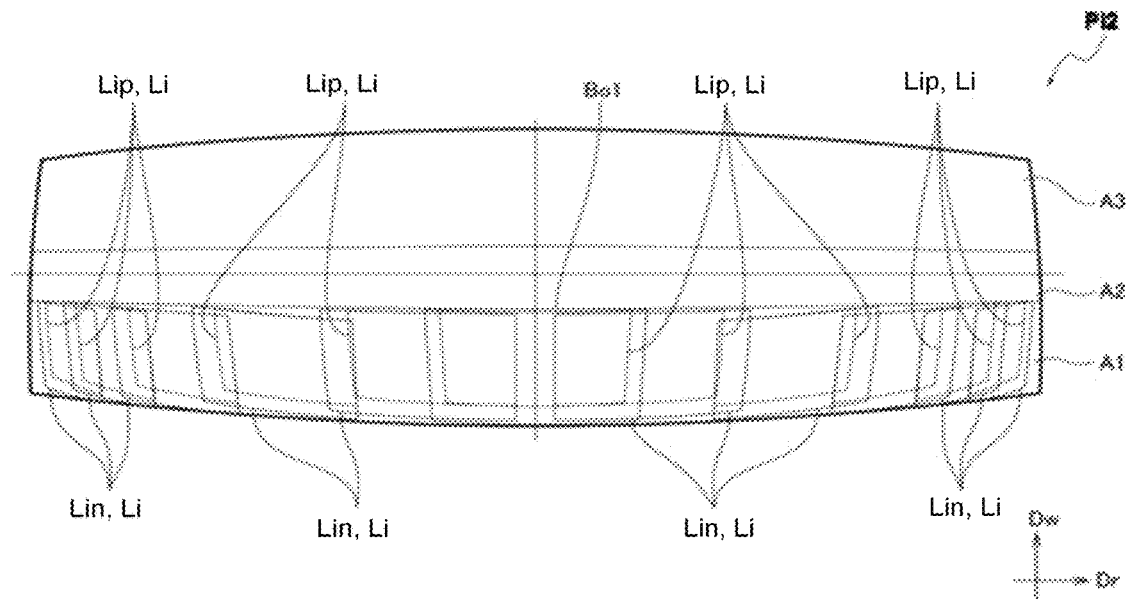
FIG. 25 is a diagram similar to FIG. 21, and illustrates the relationship between the contour position of the illumination pattern and multiple light distribution images produced by light passing through a fifth optical region on a screen.

The fifth optical region S5 is reversed in the top-bottom direction from the second optical region S2, the first illuminated area A1 of the illumination pattern Pi2 is formed, and a first outer boundary line Bo1 on the outer side (the side close to the second illuminated area A2) of the first illuminated area A1. In the fifth optical region S5, the curvature of the output surface 226 is set so as to diffuse the light (light ray group) passing through near an incident angle of −30 degrees among the light from the light source 121, to reduce the degree of diffusion as the incident angle increases, and to substantially collimate the light (light ray group) passing through near an incident angle of −10 degrees. That is, the fifth optical region S5 diffuses light in the vicinity of an incident angle of −30 degrees and focuses light as the incident angle approaches −10 degrees. Therefore, the fifth optical region S5 is sized so that the light distribution images Li of the light passing through near an angle of incidence of −30 degrees cover substantially the entire first illuminated area A1 in the width direction (reference sign Lin), as illustrated in FIG. 25. In the fifth optical region S5, the light distribution images Li of the light passing through near an angle of incidence of −10 degrees have a size corresponding to a portion of the first illuminated area A1 in the width direction and are positioned outward (upper side in FIG. 25 when viewed from the front) in the width direction of the first illuminated area A1 (reference sign Lip).

Consequently, the fifth optical region S5 projects the light distribution images Li in the first illuminated area A1 and aligns the outer edges of the light distribution images Li to form the first outer boundary line Bo1. Here, in the fifth optical region S5, when there is a light distribution image Li shifted farther outward in the width direction than the first outer boundary line Bo1, the curvature of the output surface 226 in the corresponding area is adjusted to appropriately align the light distribution images Li. Consequently, in the fifth optical region S5, while the first illuminated area A1 is emitted, light is connected on the first outer boundary line Bo1 to clarify the difference in lightness and darkness between the first illuminated area A1 and the second illuminated area A2, and thereby making the first outer boundary line Bo1 clear.

Figure 26:
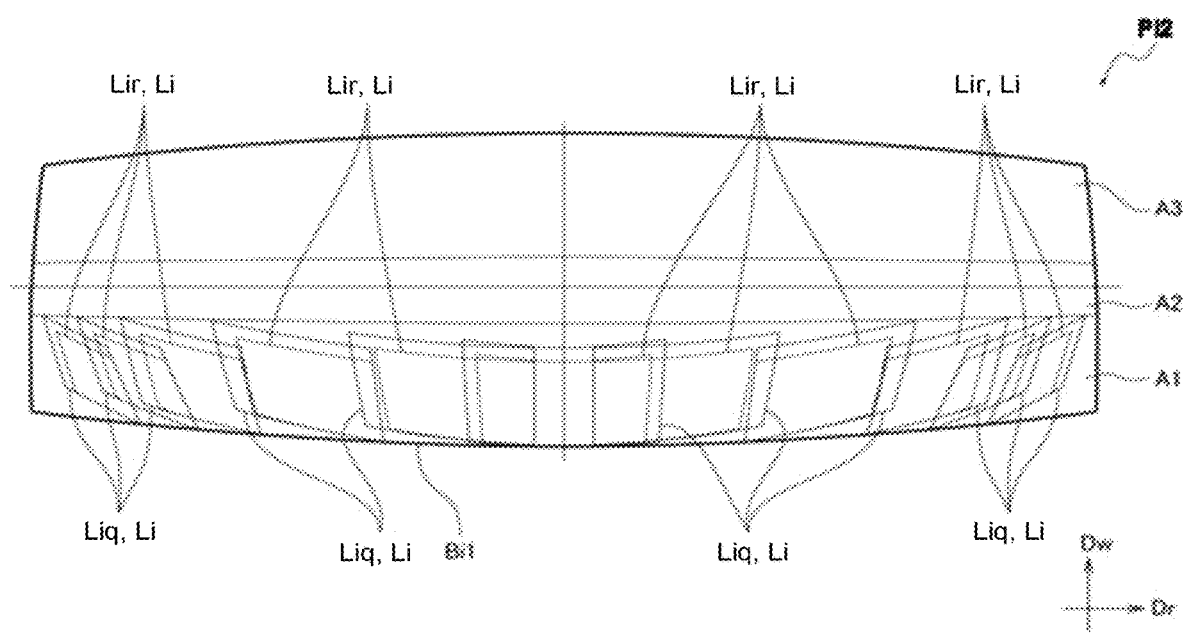
FIG. 26 is a diagram similar to FIG. 21, and illustrates the relationship between the contour position of the illumination pattern and multiple light distribution images produced by light passing through a sixth optical region on a screen.

The sixth optical region S6 is reversed in the top-bottom direction from the first optical region S1, the first illuminated area A1 of the illumination pattern Pi2 is formed, and a first inner boundary line Bi1 on the inner side (the side close to the non-illuminated area An) of the first illuminated area A1. In the sixth optical region S6, the curvature of the output surface 226 is set so as to diffuse the light (light ray group) passing through near an incident angle of −30 degrees among the light from the light source 121, to reduce the degree of diffusion as the incident angle decreases, and to substantially collimate the light (light ray group) passing through near an incident angle of −50 degrees. That is, the sixth optical region S6 diffuses light in the vicinity of an incident angle of −30 degrees and focuses light as the incident angle approaches −50 degrees. Therefore, the sixth optical region S6 is sized so that the light distribution images Li of the light passing through near an angle of incidence of −30 degrees cover substantially the entire first illuminated area A1 in the width direction (reference sign Liq), as illustrated in FIG. 26. In the sixth optical region S6, the light distribution images Li of the light passing through near an angle of incidence of −50 degrees have a size corresponding to a portion of the first illuminated area A1 in the width direction and are positioned inward (lower side in FIG. 26 when viewed from the front) in the width direction of the first illuminated area A1 (reference sign Lir).

Consequently, the sixth optical region S6 projects the light distribution images Li in the first illuminated area A1 and aligns the inner edges of the light distribution images Li to form the first inner boundary line Bi1. Here, in the sixth optical region S6, when there is a light distribution image Li shifted farther inward in the width direction than the first inner boundary line Bi1, the curvature of the output surface 226 in the corresponding area is adjusted to appropriately align the light distribution images Li. Consequently, in the sixth optical region S6, while the first illuminated area A1 is emitted, light is connected on the first inner boundary line Bi1 to clarify the difference in lightness and darkness between the first illuminated area A1 and the inside thereof (inside of the non-illuminated area An of the illumination pattern Pi), and thereby making the first inner boundary line Bi1 clear.

In the lens body 223, the incident surface 225 adjusts the surface shape so that the distortion in each light distribution image Li is reduced on the screen. Here, the incident surface 225 has different shapes for the transverse cross-section and the longitudinal cross-section.

As illustrated in FIG. 19, the transverse cross-section of the incident surface 225 is a concave surface, that is, a curved surface projecting toward the side remote from the light source 121 (the front side in the optical axis direction). This is due to the fact that when the incident surface 225 is flat, the distortion in each light distribution image Li becomes larger than when the incident surface 225 is concave, and when the incident surface 25 is convex, the distortion in each light distribution image Li becomes even larger.

As illustrated in FIG. 20, the longitudinal cross-section of the incident surface 225 is a convex surface, that is, a curved surface projecting toward the light source 121 (the rear side in the optical axis direction). This is due to the fact that when the incident surface 225 is flat, the distortion in each light distribution image Li becomes larger than when the incident surface 225 is convex, and when the incident surface 25 is concave, the distortion in each light distribution image Li becomes even larger.

Thus, the incident surface 225 is a toroidal surface (toroidal lens) having different radii of curvature in the transverse cross-section or left-right direction, and in the longitudinal cross-section or vertical direction. Note that if the incident surface 225 is convex in the longitudinal cross section and concave in the transverse cross section, the respective radii of curvature (curvature) may be set appropriately. Alternatively, the incident surface 225 may be a free curved surface based on the toroidal surface described above. Since the incident surface 225 is shaped in such a way, the distortion of each light distribution image Li can be suppressed, and the illumination pattern Pi2 can be formed using the respective light distribution images Li. This allows the lens body 223 to make the illumination pattern Pi2 more desired in shape. This is because smaller distortion of each light distribution image Li makes it easier to appropriately arrange the light distribution images Li to the corners of the set boundary lines while forming lines in alignment with the outer edges of each light distribution image Li as described above, compared with using each light distribution image Li having large distortion.

This vehicle light fixture 210 is assembled as follows with reference to FIG. 16. First, the light source unit 111 is assembled by mounting the light source 121 on a substrate 22 with the light source 121 positioned with respect to the substrate 122. Then, the respective mounting protrusions 127 of the two mounting portions 124 of the projection lens 212 are fitted into the corresponding mounting holes 122a in the substrate 122 of the light source unit 111 to fix the two mounting portions 124 to the substrate 122. Consequently, the radiating center axis of the light source 121 of the light source unit 111 and the lens axis of the lens body 223 of the projection lens 212 are aligned and disposed at a predetermined distant, and they serve as the optical axis La in the vehicle light fixture 210. In this state, the light source unit 111 and the projection lens 112 are attached to each other to assemble the vehicle light fixture 210.

As illustrated in FIG. 15, the vehicle light fixture 210 is installed in the light compartment in a state in which the optical axis La tilts with respect to the road surface 200 around the vehicle M while being directed to the side of the vehicle M. The vehicle light fixture 210 appropriately turns on and off the light source 121 by supplying power from the lighting control circuit from the substrate 122 to the light source 121. The light from the light source 121 is projected while the light is controlled by the projection lens 212 to form, on the road surface 200, the illumination pattern Pi2 arranging the first illuminated area A1, the second illuminated area A2, and the third illuminated area A3 in a strip extending in the traveling direction. The illumination pattern Pi2 has a trapezoidal shape that widens as it moves from the vehicle M, and a non-illuminated area An is formed between the vehicle M and the first illuminated area A1. The illumination pattern Pi2 can partially illuminate the road surface 200 on the left and right sides near the front edge of the vehicle M. The illumination pattern Pi2 is formed in conjunction with a turn lamp as an example in the second modification, and can inform the surrounding that the vehicle M is making a right or left turn.

In the illumination pattern Pi2, the first inner boundary line Bi1 and the first outer boundary line Bo1 of the first illuminated area A1, and the third inner boundary line Bi3 and the third outer boundary line Bo3 of the third illuminated area A3 are formed by the above settings of the respective optical regions (S1 to S6). Therefore, it is easy to grasp that the illumination pattern Pi2 is formed by three illuminated areas (A1, A2, and A3) extending in a strip in the traveling direction, because the boundary with the surrounding area and the boundaries of the illuminated areas (A1, A2, and A3) are clear. Note that, as illustrated in FIGS. 15 and 17, in the illumination pattern Pi2 of the second modification, the distance to the road surface 200 increases outward in the width direction due to the tilt of the optical axis La with respect to the road surface 200, so that the light intensity in the vicinity of the third outer boundary line Bo3 of the third illuminated area A3 gradually decreases, and the third outer boundary line Bo3 is less prominent. Therefore, in the illumination pattern Pi2 of the second modification, the third outer boundary line Bo3 is blurred, and can indicate a direction away from the vehicle M.

In the illumination pattern Pi2, the second illuminated area A2 is illuminated with only a portion of the light that has passed through the third optical region S3 and the fourth optical region S4. In contrast, the first illuminated area A1 is illuminated with almost all of the light that has passed through the first optical region S1 and the second optical region S2, and a portion of the light that has passed through the third optical region S3. Similarly, the third illuminated area A3 is illuminated with almost all of the light that has passed through the fifth optical region S5 and the sixth optical region S6, and a portion of the light that has passed through the fourth optical region S4. Therefore, in the illumination pattern Pi2, the second illuminated area A2 is the darkest. The third illuminated area A3 is darker than the first illuminated area A1 because the distance to the road surface 200 is increased by the tilt of the optical axis La with respect to the road surface 200.

The action of the vehicle light fixture 210 will now be explained with reference to FIGS. 15 to 17. Note that, in FIG. 17, a motorcycle 300 is illustrated without its driver to facilitate understanding. The vehicle light fixture 210 is linked to the turn lamps, and when either the left or right turn lamp is turned on, the light source 121 corresponding to the turn lamp turned is turned on to form an illumination pattern Pi2 on the road surface 200. For example, FIG. 17 illustrates a scene in which the vehicle M is traveling straight down a road and is about to make a left turn. The left turn lamp of the vehicle M is flashed, and the vehicle light fixture 210 installed in front left side forms an illumination pattern Pi2 on the road surface 200. Then, the driver of the motorcycle 300 traveling behind the vehicle M can see the illumination pattern Pi2 formed on the road surface 200 even if he or she cannot see, misses, or has difficulty seeing the turn lamp of the vehicle M, and thus can grasp that the vehicle M is going to turn left.

In the vehicle M, since the left and right vehicle light fixtures 210 are linked to the turn lamps, when both turn lamps are turned on as hazard lamps, the left and right vehicle light fixtures 210 simultaneously form illumination patterns Pi2 on the road surface 200 (see FIG. 15). Therefore, the vehicle light fixtures 210 can make persons in the vicinity of the vehicle M to more reliably recognize that the vehicle light fixtures 210 are lit as hazard lamps than when only the left and right turn lamps are blinking.

Furthermore, the vehicle light fixture 210 makes the first inner boundary line Bi1, the first outer boundary line Bo1, the third inner boundary line Bi3, and the third outer boundary line Bo3 clear by focusing light, and can form the illumination pattern Pi2 in which the boundary with the surroundings and the boundaries of the respective illuminated area (A1, A2, and A3) are clear. Therefore, the vehicle light fixture 210 can make the shape of the illumination pattern Pi2 recognizable even without increasing the light intensity of the light source 121, and can convey some intention of the driver (the intension of turning right or left, for example, in the second modification) to persons in the vicinity with the formed illumination pattern Pi2

Here, the conventional vehicle light fixture described in the conventional art merely projects an illumination pattern onto the road surface in the vicinity of the vehicle, and do not form the contour (outer boundary lines) of the illumination pattern. Therefore, the conventional vehicle light fixture forms a dimly glowing area as the illumination pattern, may make it difficult to recognize the shape of the illumination pattern. Such an illumination pattern makes it difficult to determine whether it is formed by light from the vehicle or light from a source other, such as a streetlight in the vehicle, and thereby it may make it difficult to convey some intention of the driver to those in the vicinity.

Therefore, it is presumed that the conventional vehicle light fixture may form an illumination pattern by projecting multiple light points or multiple light lines, and thereby making it possible to determine that the illumination pattern is formed by light from the vehicle. However, such an illumination pattern has pitch-black areas illuminated with no light between the light points and light lines, and thus the ratio of the illuminated areas to the total is reduced. Therefore, this illumination pattern is less bright as a whole, and there is room for improvement in terms of alerting the user. In particular, when the pitch-dark areas extend in the width direction in the illumination pattern, the pitch-dark areas appear to be crushed when viewed from a distance, but the pitch-dark region can be recognized when they are close-up, and the shape (illumination mode) is made to change in accordance with a change in distance, that is, a change in viewing angle.

In contrast, the vehicle light fixture 210 of the second modification forms the illumination pattern Pi2 by arranging the first illuminated area A1, the second illuminated area A2, and the third illuminated area A3 in a strip extending in a traveling direction. Since the vehicle light fixture 210 forms a strip-like illumination pattern Pi2 extending in the traveling direction, the illumination pattern Pi2 can be made to differ from the light emitted from a streetlight or the like, and thus the illumination pattern Pi2 can be easily determined as one being formed by light from the vehicle. Here, it is generally known that a pattern provided on the road surface 200 is easily recognizable by a driver of a vehicle or the like if the pattern extends in the traveling direction. As a result, the vehicle light fixture 210 can present the illumination pattern Pi2 that is easy to recognize, can be more easily determined to be formed by light from the vehicle, and can appropriately convey some intention of the driver (such as a right or left turn, in the second modification) to persons in the vicinity.

In particular, the vehicle light fixture 210 of the second modification focuses light at the respective boundary lines (Bi1, Bo1, Bi3, and Bo3) in the illumination pattern Pi2, and thereby makes the boundary with the surroundings and the boundaries of the respective illuminated areas (A1, A2, and A3) clear. As a result, the vehicle light fixture 210 can make it clear that the formed illumination pattern Pi2 has three illuminated areas and can be recognized as three strips extending in the traveling direction. Therefore, the vehicle light fixture 210 can make the illumination pattern Pi2 (its shape) recognized without increasing the light intensity of the light source 121 in comparison with the conventional vehicle light fixture. Since the vehicle light fixture 210 makes the shape of the illumination pattern Pi2 clear by forming the respective boundary lines through the optical settings of the lens body 223, the configuration can be simplified in comparison with the case where the shape is formed using a filter. Since this enables the vehicle light fixture 210 to make persons in the surrounding to recognize the illumination pattern Pi2 having an intended shape, it can appropriately convey some intention of the driver to persons in the surrounding while keeping the configuration simple.

The vehicle light fixture 210 of the second modification provides an illumination pattern Pi2 that has three illuminated areas (A1, A2, and A3) formed by emitting light on the road surface 200. For this reason, the vehicle light fixture 210 can illuminate the illumination pattern Pi2 over the entire area, although there is a difference in illuminance, and thereby the brightness of the entire pattern can be sufficient, the change in shape (illumination mode) with the change in distance can be prevented, and persons in the surrounding can be appropriately alerted.

Since the light source 121 of the vehicle light fixture 210 of the second modification emits amber color light, the effect of chromatic aberration in the projection lens 212 can be greatly suppressed. Therefore, the vehicle light fixture 210 can form the illumination pattern Pi2 in which the boundary with the surroundings and the boundaries of the respective illuminated areas (A1, A2, and A3) are more clearly defined.

In addition, the vehicle light fixture 210 of the second modification forms the respective illuminated areas by dividing the lens body 223 into six optical regions (S1 to S6) in the top-bottom direction and setting the curvature (surface shape) of the respective output surfaces 226 by individually setting the portions corresponding to the three illuminated areas (A1, A2, and A3). Therefore, the vehicle light fixture 210 can form the illumination pattern Pi2 with three illuminated areas with a simple configuration including the light source unit 111 and the projection lens 212 without using a new light source, so that the illumination pattern Pi2 can be more readily recognized.

The vehicle light fixture 210 of the second modification makes the dimension in the width direction of the first illuminated area A1 of the illumination pattern Pi2 equal to the white line formed on the road surface 200. The white line is made to extend in the traveling direction with a set dimension in the width direction from the viewpoint of making it easy for the driver of the vehicle to recognize. Therefore, the vehicle light fixture 210 can make the first illuminated area A1 of the illumination pattern Pi2 easily recognizable and can appropriately issue an alert.

Figure 27:
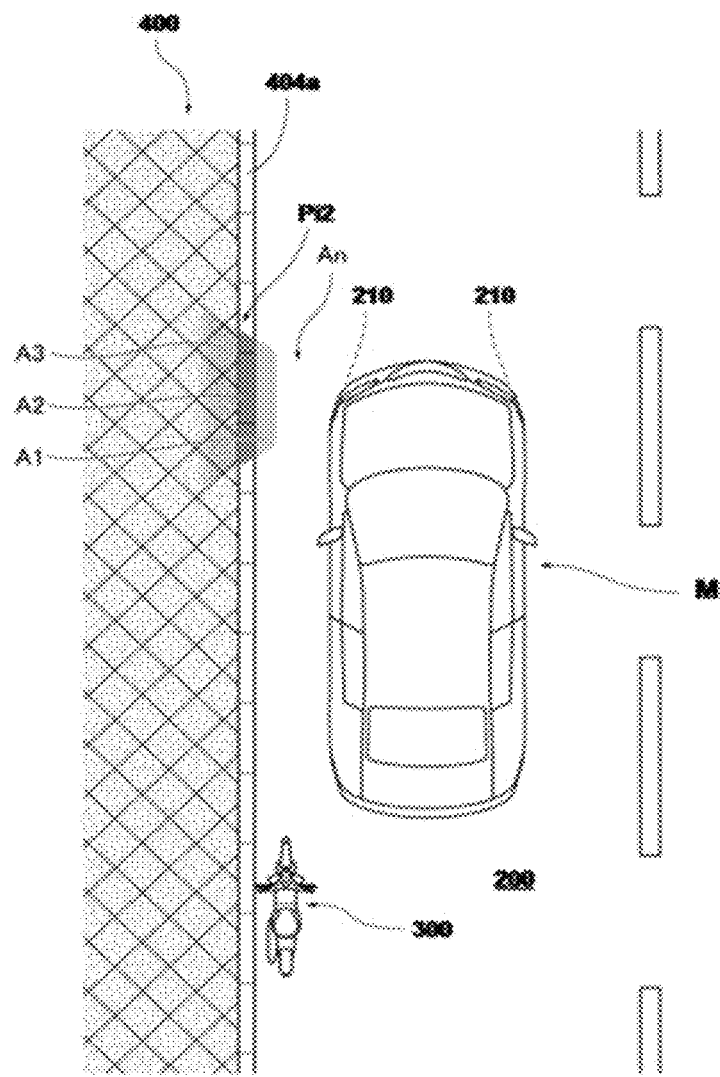
FIG. 27 is a diagram illustrating a usage example as an example of an illumination pattern formed by a vehicle light fixture.

In particular, with the vehicle light fixture 210 of the second modification, the dimension of the first illuminated area A1 together with the non-illuminated area An in the width direction is the minimum value that allows a motorcycle 300, such as a motorcycle or a bicycle, to pass by the vehicle M. Therefore, the vehicle light fixture 210 can appropriately alert the motorcycle 300 (its driver) that is attempting to pass by. The reasons for this are as follows. For example, the vehicle M is traveling on the road surface 200 with a sidewalk 400 having sidewalk boundary blocks 404a, and there is enough space between the sidewalk 400 (the sidewalk boundary blocks 404a) and the vehicle M to allow the motorcycle 300 to drive through this space, as illustrated in FIG. 27. In this scene, when the vehicle light fixture 210 forms the illumination pattern Pi2 on the road surface 200 on the side of the sidewalk 400, a portion of the illumination pattern Pi2 is formed on the sidewalk 400. However, the vehicle light fixture 210 can form at least the first illuminated area A1 on the road surface 200 with the setting of the dimensions in the width direction when the motorcycle 300 can pass by. When the vehicle M moves closer to the sidewalk 400 than the state illustrated in FIG. 27, the vehicle light fixture 210 forms a portion or the entirety of the first illuminated area A1 on the sidewalk 400, but it is difficult for the motorcycle 300 to pass between the vehicle M and the sidewalk 400. Therefore, the vehicle light fixture 210 can present the first illuminated area A1, which is at least the brightest and substantially the same dimension as the white line in the width direction, to the motorcycle 300 (its driver) that is attempting to pass by, and can appropriately alert the driver. This means that the vehicle light fixture 210 can appropriately alert the motorcycle 300 (its driver) even in a situation where it is difficult for persons in the surrounding to see the turn lamp, such as when the vehicle M is about to change lanes in a traffic jam.

The vehicle light fixture 210 of the second modification has diffusing portions 128 on the two side faces 223a of the lens body 223 and the outer side faces 124a of the respective mounting portions 124, which are the end surfaces in the left-right direction in the projection lens 212. Therefore, the vehicle light fixture 210 can scatter the light from the light source 121 guided into the projection lens 212 by the scattering portions 128 even when the light is emitted from the two side faces 223a of the lens body 223 and the outer side faces 124a of the respective mounting portions 124. Consequently, the vehicle light fixture 210 can prevent the light emitted from the two side faces 223a and the two outer side faces 124a from becoming leaking light that illuminates the illumination pattern Pi2 or an unintended area in the vicinity of the illumination pattern Pi. Therefore, the vehicle light fixture 10 can suppress the blurring of the illumination pattern Pi2 and can appropriately form the illumination pattern Pi2.

The vehicle light fixture 210 of the second modification can achieve each of the following effects.

The vehicle light fixture 210 includes the light source 121 and the projection lens 212 that projects light emitted from the light source 121 to form the illumination pattern Pi2. In the vehicle light fixture 210, the formed illumination pattern Pi2 has the first illuminated area A1, the second illuminated area A2, and the third illuminated area A3 extending in the traveling direction, and the second illuminated area A2 is darkest. In the vehicle light fixture 210, the projection lens 212 forms the first outer boundary line Bo1 outside the first illuminated area A1 and the third inner boundary line Bi3 inside the third illuminated area A3. For this reason, the vehicle light fixture 210 can make the first outer boundary line Bo1 and the third inner boundary line Bi3 clear, can make the lightness and darkness of the second illuminated area A2 positioned in the middle in the illumination pattern Pi2 clear, and can make the shapes of the three illuminated areas (A1, A2, and A3) extending in the traveling direction easily recognizable. Consequently, the vehicle light fixture 210 can allow easy determination that the illumination pattern Pi2 is formed by light from the vehicle M, and can appropriately alert persons in the surrounding of the vehicle M.

The vehicle light fixture 210 provides the non-illuminated area An adjacent to the inside of the first illuminated area A1 of the illumination pattern Pi2. Since the vehicle light fixture 210 provides the non-illuminated area An between the illumination pattern Pi2 and the vehicle M, it can be recognized that the light is not a decorative light illuminating the lower portion of the vehicle M, and the illumination pattern Pi2 can be made to glow on the dark road surface 200 to increase the visibility of the illumination pattern Pi2.

In the vehicle light fixture 210, the projection lens 212 forms the first inner boundary line Bi1 inside the first illuminated area A1. Therefore, the vehicle light fixture 210 can make the first inner boundary line Bi1, i.e., the inner edge of the illumination pattern Pi2, clearer and can facilitate the recognition of the shape of the illumination pattern Pi2.

The vehicle light fixture 210 makes the first illuminated area A1 brighter than the third illuminated area A3 in the illumination pattern Pi2. Therefore, the vehicle light fixture 210 makes the first illuminated area A1, which is the closest to the vehicle M, the brightest, to facilitate the recognition of the shape of the illumination pattern Pi2.

The vehicle light fixture 210 makes the dimension in the width direction the smallest for the second illuminated area A2, larger for the largest for the third illuminated area A3 in the illumination pattern Pi2. Therefore, the vehicle light fixture 210 can be brightened the entire pattern because the second irradiation area A2, which is the darkest, is small, and the third illuminated area A3, which is the farthest from the vehicle M, is the largest, to give a sense of expansiveness. Consequently, the vehicle light fixture 210 can enhance the design of the illumination pattern Pi2 and facilitate the recognition of the shape of the illumination pattern Pi2. In particular, since the vehicle light fixture 210 of the second modification makes the dimension of the first illuminated area A1 in the width direction equal to that of the white line formed on the road surface 200, the first illuminated area A1 can be made easily recognizable, an appropriately alert can be issued.

In the vehicle light fixture 210, the projection lens 212 forms the first outer boundary line Bo1 with the multiple light distribution images Li projected onto the lower region (the fifth optical region S5) and forms the third inner boundary line Bi3 with the multiple light distribution images Li projected in the upper region (the second optical region S2). Since the vehicle light fixture 210 forms the first outer boundary line Bo1 and the third inner boundary line Bi3 individually in two regions defined by dividing the projection lens 212 in the top-bottom direction, the illumination pattern Pi2 can be readily recognized with a simple configuration including the light source unit 111 and the projection lens 212 without using a new light source.

In the vehicle light fixture 210, the projection lens 212 forms the first inner boundary line Bi1 of the inside of the first illuminated area A1 with the multiple light distribution images Li projected onto the lower end region (the sixth optical region S6) and forms the third outer boundary line Bo3 of the outside of the third illuminated area A3 with the multiple light distribution images Li projected onto the upper end region (the first optical region S1). Since the vehicle light fixture 210 forms the first inner boundary line Bi1 and the third outer boundary line Bo3 individually in two regions defined by further dividing the projection lens 212 in the top-bottom direction, the illumination pattern Pi2 can be readily recognized with a simple configuration including the light source unit 111 and the projection lens 212.

In the vehicle light fixture 210, the projection lens 212 forms the second illuminated area A2 using the multiple light distribution images Li projected onto the central region (the third optical region S3 and the fourth optical region S4). Since the vehicle light fixture 210 forms the second illuminated area A2 in two regions defined by further dividing the projection lens 212 in the top-bottom direction, the illumination pattern Pi2 can be readily recognized with a simple configuration including the light source unit 111 and the projection lens 212 without using a new light source.

Accordingly, the vehicle light fixture 210 of the second modification as a vehicle light fixture according to the disclosure can form an illumination pattern Pi2 that can appropriately alert persons in the surrounding.

Note that, in the second modification, the illumination pattern Pi2 has a trapezoidal shape that widens away from the vehicle M on the road surface 200. However, if the illumination pattern Pi2 has a second illuminated area A2 between the first illuminated area A1 and the third illuminated area A3 extending in the traveling direction, and the second illuminated area A2 is the darkest, the shape may be set appropriately without being limited to a trapezoidal shape, and is not limited to the configuration of the second modification described above.

In the second modification, the entire second illuminated area A2 of the illumination pattern Pi2 is set to a single brightness. However, the second illuminated area A2 may have multiple areas having different brightnesses, as long as it is darker than the first illuminated area A1 and the third illuminated area A3, and is not limited to the configuration of the second modification. For example, the second illuminated area A2 may have sections of different brightnesses extending in the traveling direction in parallel in the width direction. In such a case, if the section adjacent to the first illuminated area A1 (the first outer boundary line Bo1) and the third illuminated area A3 (the third inner boundary line Bi3) is darker than the first illuminated area A1 and the third illuminated area A3, the intermediate portion of the second illuminated area A2 may include sections that have substantially the same brightness as that of the first illuminated area A1 and the third illuminated area A3. That is, the illumination pattern Pi2 may have five or more illuminating strips extending in the traveling direction, including the first illuminated area A1, the third illuminated area A3, bright strips extending in the traveling direction in the second illuminated area A2. Even in such a case, the second illuminated area A2 has regions darker than both illuminated areas (A1 and A3), and thus the second illuminated area A2 is darker than both illuminated areas as a whole.

Furthermore, in the second modification, the projection lens 212 forms the respective boundary lines (Bi1, Bo1, Bi3, and Bo3). However, the projection lens 12 need only form at least the first outer boundary line Bo1 and the third inner boundary line Bi3, and is not limited to the configuration of the second modification described above.

Furthermore, in the second modification, scattering portions 128 are disposed on the two side faces 223a of the lens body 223 and the outer side faces 124a of the respective mounting portions 124 in the projection lens 212. However, the scattering portions 128 may be appropriately provided at locations other than the two side faces 223a and the two outer side faces 124a, so long as the locations are those other than the incident surface 225 and the output surface 226 of the projection lens 212 and those where light from the light source 121 guided into the projection lens 212 becomes leaked light, and the scattering portions 128 are not limited to the configuration of the second modification described above.

In the second modification, the projection lens 212 sets the upper end region, the upper region, the central region, the lower region, and the lower end region as described above (the respective optical regions (S1 to S6)). However, the respective region of the projection lens 212 only need to be provided, in the top-bottom direction, with the upper region at an upper position that does not include the optical axis, the upper end region at an upper position in the upper region, the lower region at a lower position that does not include the optical axis, the lower end region at a lower position in the lower region, and the central region at a position that includes the optical axis, and the configuration is not limited to that of the second modification.

Although the vehicle light fixture of the disclosure has been described on the basis of the embodiments and the modifications, the specific configuration is not limited to that of the embodiments and the modifications, and design changes and additions are allowed without deviation from the gist of the invention according to each claim of the invention.

DESCRIPTION OF REFERENCE NUMERALS AND SYMBOLS $\theta 1, \theta 2$ angle;
C1, C2, C3, C4 corner;
C5, C6, C7 end
E3, E5, E6, E7, E8, E9 edge;
E4 side edge;
P2, SP2 side light distribution;
AR1 central illuminated area;
AR2 visible area;
ML, SL, SL1, SL2 light;
LP low beam pattern;
MP main light distribution;
SP sub-light distribution;
SP1 forward light distribution;
10 housing;
11 outer lens;
20 main light distribution illuminator;
21 segment;
30, 30A, 30B sub-light distribution illuminator;
31 forward illuminator;
32 side illuminator;
33 light source;
34, 37 lens;
35 heatsink;
36, 36B support member;
38 filter;
100 vehicle light fixture;
110, 210 vehicle light fixture;
112, 212 projection lens;
121 light source;
125, 225 incident surface;
126, 226 output surface;
131 upper lens section;
132 lower lens section;
L1 width direction line;
L2 top-bottom direction line
La optical axis;
Lp line portion;
B light-dark boundary line;
Pf far-side pattern portion;
Pn near-side pattern portion;
Pi, Pi2 illumination pattern;
A1 first illuminated area;
A2 second illuminated area;
A3 third illuminated area;
An non-illuminated area;
Bi1 first inner boundary line;
Bi3 third inner boundary line;
Bo1 first outer boundary line;
Li light distribution image;
S1 upper end region (first optical region);
S2 upper region (second optical region);
S3, S4 central region (third optical region, fourth optical region);
S5 lower region (fifth optical region);
S6 lower end region (sixth optical region).

The invention claimed is:

1. A vehicle light fixture comprising:
a first light distribution illuminator that emits a first light distribution to the front of a vehicle; and
a second light distribution illuminator that emits a second light distribution to at least a side of the vehicle, wherein,
illumination of the first light distribution illuminator and the second light distribution illuminator is controlled in response to a predetermined operation of the first light distribution illuminator by a driver of the vehicle,
the second light distribution illuminator is illuminated in conjunction with the illumination of the first light distribution illuminator,
the second light distribution has a light-dark boundary line,
the second light distribution illuminator comprises a forward illuminator that illuminates the front of the vehicle, and
the forward illuminator illuminates inside of a visible area where the first light distribution is visible from outside the vehicle in a left-right direction while the forward illuminator is mounted in the vehicle.

2. The vehicle light fixture according to claim 1, wherein the second light distribution illuminator emits the second light distribution outside a visible area where the first light distribution is visible from outside the vehicle in a left-right direction while the second light distribution illuminator is mounted in the vehicle.

3. The vehicle light fixture according to claim 1, wherein the second light distribution illuminator comprises a light source and a lens that emits light from the light source as the second light distribution.

4. The vehicle light fixture according to claim 3, wherein a maximum luminous intensity of the second light distribution is lower than a maximum luminous intensity of the first light distribution.

5. The vehicle light fixture according to claim 3, wherein the second light distribution has a geometric shape.

6. The vehicle light fixture according to claim 1, wherein at least the first light distribution illuminator constitutes a vehicle turn lamp.

7. A vehicle light fixture that is controlled to illuminate in conjunction with illumination of a first vehicle light fixture when the first vehicle light fixture is illuminated in response to a predetermined operation by a driver of the vehicle, the first vehicle light fixture emitting a first light distribution to the front of a vehicle, the vehicle light fixture comprising;
- a light source; and
- a projection lens that projects light emitted from the light source to form an illumination pattern surrounded by multiple light-dark boundary lines and emits the illumination pattern to a side of the vehicle,
- wherein the projection lens focuses more of the light emitted from the light source as the light passes farther outward of an optical axis of the projection lens, and focuses the light emitted from the light source on at least a portion of the light-dark boundary lines for emphasis.

8. The vehicle light fixture according to claim 7, wherein the projection lens focuses the light emitted from the light source, inside the light-dark boundary lines, and diffuses the light emitted from the light source in other portion of the illumination pattern.

9. The vehicle light fixture according to claim 7, wherein,
- the projection lens is formed of multiple lens sections in a top-bottom direction,
- the illumination pattern is formed of multiple illumination pattern sections formed by the lens sections, and
- the projection lens forms the light-dark boundary lines by overlapping the illumination pattern sections.

10. The vehicle light fixture according to claim 9, wherein,
- the lens sections are formed of an upper lens section and a lower lens section,
- the upper lens section forms a far-side pattern portion illuminating an area remote from the vehicle in the illumination pattern, and the lower lens section forms a near-side pattern portion illuminating an area near the vehicle in the illumination pattern, and
- the projection lens overlaps an end portion of the far-side pattern portion close to the vehicle and an end portion of the near-side pattern portion remote from the vehicle to form a line portion having a higher light intensity than a peripheral area in the illumination pattern.

11. The vehicle light fixture according to claim 7, wherein at least a portion of the projection lens other than an incident surface and an output surface is provided with a diffusing portion.

12. The vehicle light fixture according to claim 11, wherein the output surface of the projection lens is a convex surface and an area around a top-bottom direction line extending in a top-bottom direction through the optical axis and an area around a width direction line extending in a width direction through the optical axis are concave relative to other areas.

13. The vehicle light fixture according to claim 7, wherein an incident surface of the projection lens is convex in a cross-section orthogonal to a width direction and concave in a cross-section orthogonal to a top-bottom direction.

14. The vehicle light fixture according to claim 7, wherein,
- the illumination pattern has a first illuminated area that extends in a traveling direction, a second illuminated area that is disposed outside the first illuminated area and is darker than the first illuminated area, and a third illuminated area that is disposed outside the second illuminated area and is brighter than the second illuminated area, and
- the projection lens forms a first outer boundary line outside the first illuminated area and a third inner boundary line inside the third illuminated area.

15. The vehicle light fixture according to claim 14, wherein the first illuminated area is brighter than the third illuminated area in the illumination pattern.

16. A vehicle light fixture comprising:
- a first light distribution illuminator that emits a first light distribution to the front of a vehicle; and
- a second light distribution illuminator that emits a second light distribution to at least a side of the vehicle, wherein,
- illumination of the first light distribution illuminator and the second light distribution illuminator is controlled in response to a predetermined operation of the first light distribution illuminator by a driver of the vehicle,
- the second light distribution illuminator is illuminated in conjunction with the illumination of the first light distribution illuminator,
- the second light distribution has a light-dark boundary line,
- the second light distribution illuminator comprises a light source and a lens that emits light from the light source as the second light distribution, and
- a maximum luminous intensity of the second light distribution is lower than a maximum luminous intensity of the first light distribution.

* * * * *